United States Patent [19]

Sakakida et al.

[11] Patent Number: 5,150,919
[45] Date of Patent: Sep. 29, 1992

[54] AIR BAG SYSTEM FOR VEHICLE

[75] Inventors: Masafumi Sakakida; Yasunori Iwamoto; Toshiyuki Manabe, all of Hiroshima; Hisao Muramoto, Yamaguchi; Haruhiro Inada, Hiroshima; Isao Hirashima, Hiroshima; Kazuhiro Ushijima, Hiroshima, all of Japan

[73] Assignee: Mazda Motor Corporation, Hiroshima, Japan

[21] Appl. No.: 573,786

[22] Filed: Aug. 28, 1990

[30] Foreign Application Priority Data

Aug. 30, 1989 [JP] Japan ................................. 1-223885
Feb. 1, 1990 [JP] Japan ................................. 2-20390
Feb. 26, 1990 [JP] Japan ................................. 2-42687
Mar. 27, 1990 [JP] Japan ................................. 2-75519
Mar. 29, 1990 [JP] Japan ................................. 2-78701

[51] Int. Cl.⁵ ............................................. B60R 21/16
[52] U.S. Cl. ................................................... 280/732
[58] Field of Search ................... 280/728, 732, 743; 296/70, 72

[56] References Cited

U.S. PATENT DOCUMENTS

| | | | |
|---|---|---|---|
| 3,622,176 | 11/1971 | Byer | 280/732 |
| 3,708,179 | 1/1973 | Hulten | 280/732 |
| 3,966,227 | 6/1976 | Cameron | 280/752 |
| 4,770,439 | 9/1988 | Maier et al. | 280/732 |
| 4,773,673 | 9/1988 | Sakurai | 280/732 |
| 4,842,299 | 6/1989 | Okamura et al. | 280/743 |

FOREIGN PATENT DOCUMENTS

| | | | |
|---|---|---|---|
| 364714 | 4/1990 | European Pat. Off. | 280/743 |
| 378314 | 7/1990 | European Pat. Off. | 280/743 |
| 3800652 | 7/1988 | Fed. Rep. of Germany | |
| 3843686 | 6/1990 | Fed. Rep. of Germany | 280/743 |
| 2111600 | 6/1972 | France | |

Primary Examiner—Charles A. Marmor
Assistant Examiner—Tamara L. Graysay
Attorney, Agent, or Firm—Fleit, Jacobson, Cohn, Price, Holman & Stern

[57] ABSTRACT

An air bag system includes an instrument panel provided with an opening in the vicinity of a passenger's seat. An air bag unit is disposed in the opening and provided with an air bag and a casing for receiving the air bag, and a lid device is disposed at a rear end of the casing for covering the opening. At least a pair of belt members, spaced transversely and in a mirror image relationship with regard to a vertical center line for connecting the lid device with the instrument panel, are provided. One end of the belt member is mounted on the lid device at a position offset from a transverse center line of the lid device. When the air bag inflated, the lid device is swung about a transverse axis so as to be opened smoothly.

21 Claims, 23 Drawing Sheets

FIG. 11
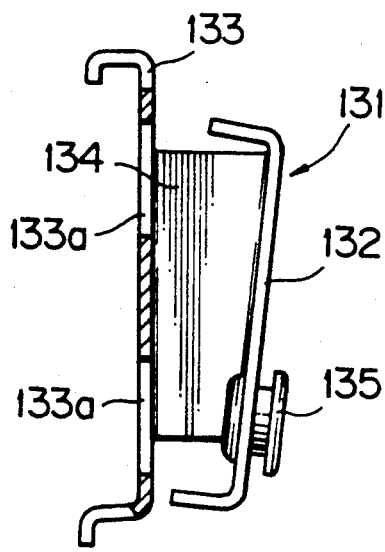
FIG. 12
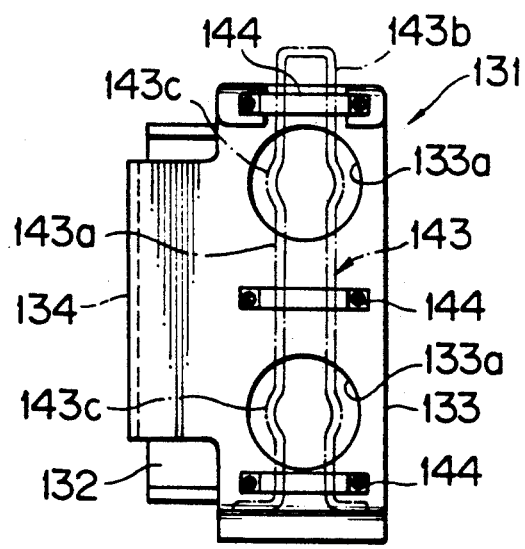
FIG. 13
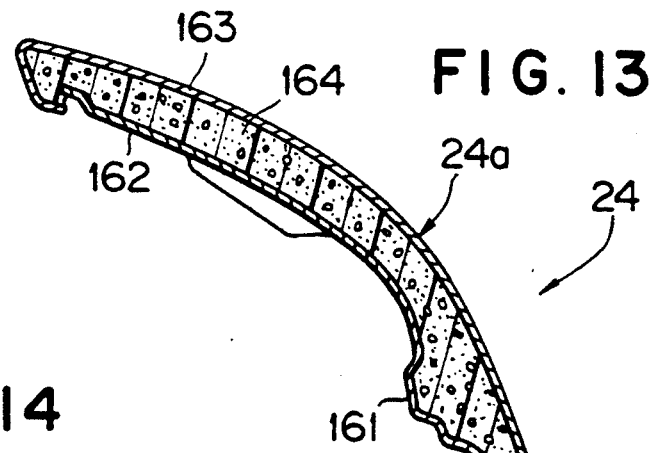
FIG. 14
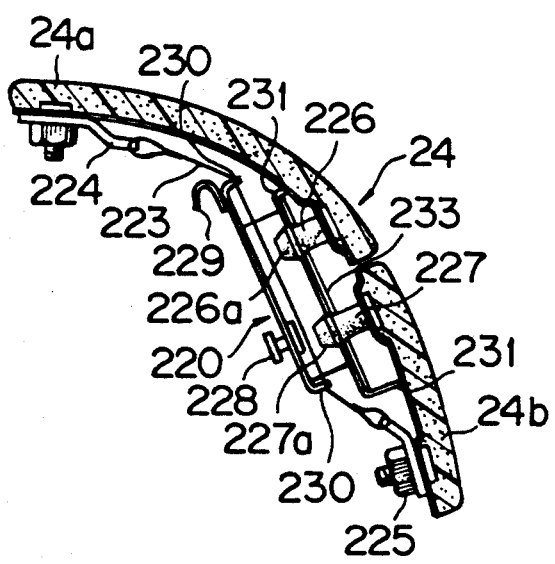
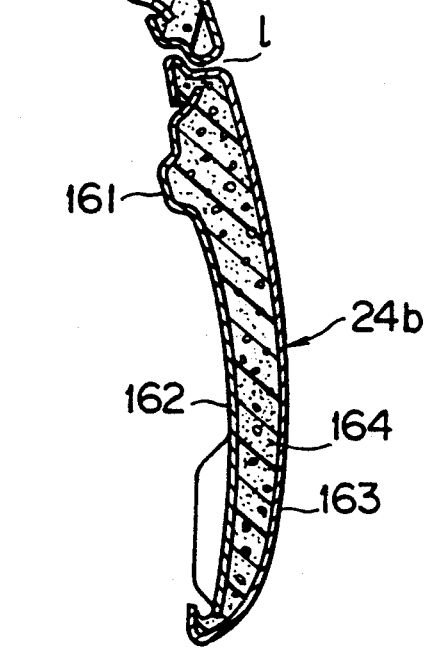

AIR BAG SYSTEM FOR VEHICLE

BACKGROUND OF THE INVENTION

1. Field of the Invention

This invention relates to an air bag system for a vehicle.

2. Description of Related Art

Conventionally, there has been known an air bag system mounted on an automobile as a safety device for a passenger in which the passenger is prevented from being injured in case of a collision thereof. The air bag system, provided with an air bag unit having an inflator and air bag, is disposed behind an instrument panel through an opening thereof in front of the passenger's seat. In the air bag system, the inflater is actuated to produce gas to develop the air bag for protecting the passenger's head and the breast when a collision occurs.

Around the opening is provided a cover member or an air bag lid which is continuous from a surface of the instrument panel. The air bag lid is opened as the air bag is inflated.

In order to smoothly open the air bag lid as the air bag is inflated, there is provided a hinge mechanism having a transverse pivotal axis, connecting the air bag lid with the instrument panel and including such as an arcuated hinge member disclosed in Japanese Utility Model Public Disclosure No. 63-176749, laid open to the public in 1988 or a plurality of panel hinge members as disclosed in Japanese Utility Model Public Disclosure No. 64-7055, laid open to the public in 1989. In order to keep the air bag lid at the closed position, there has been used a fitting structure provided with a resilient fastener, a projection formed on the air bag lid to be engaged with the fastener for connecting the air bag lid with a body member as disclosed in Japanese Utility Model Public Disclosure No. 63-176749, laid open to the public in 1988.

In some automobiles, the instrument panel is designed to be continuous from a side door line for looking good in a manner that the air bag lid is made arcuate with opposite side ends thereof being projected rearwardly. Therefore, such air bag lid cannot be properly opened as the air bag is inflated.

In an air bag system having the fitting structure with the fastener and the projection, the projection of the air bag lid may hit the passenger as it is opened.

SUMMARY OF THE INVENTION

An object of the invention is, therefore, to provide an air bag system in which an air bag lid can be smoothly opened, even where the instrument panel is made rearwardly arcuate at opposite side ends.

Another object of the invention is to provide an air bag system which can prevent the air bag lid from hitting the passenger as the air bag lid is opened.

Still another object of the invention is to provide a method for mounting an air bag system into a vehicle body in which the air bag lid can be smoothly opened even where the instrument panel is made rearwardly arcuate at the opposite side ends.

The above objects of the invention can be accomplished by an air bag system comprising an instrument panel provided with an opening in the vicinity of a passenger's seat, an air bag unit disposed in the opening and provided with an air bag and a casing for receiving the air bag. Lid means are disposed at a rear end of the casing for covering the opening, and at least a pair of connecting means, preferably belt means, are spaced transversely in a mirror image relationship with regard to a vertical center line for connecting the lid means with the instrument panel. One end of the connecting means is mounted on the lid means at a position offset from a transverse center line of the lid means.

In a preferred embodiment, the air bag system further comprises a holding means for maintaining the lid means in a closed position, and the holding means remains within the lid means as the lid means is opened.

The holding means is preferably ruptured when the lid means is opened.

In assembling the air bag unit, the air bag unit is mounted in a space defined by the instrument panel through the opening of the instrument panel with the lid means being opened. Thereafter, the lid means is closed. The holding means is preferably a fastener for engaging a bracket mounted on the instrument panel.

As the lid means is opened, the lid means is swung about one end thereof as a fulcrum with regard to a transverse axis.

In another aspect of the invention, the lid means comprises an upper lid and lower lid. The upper lid is swung upwardly as it is opened about an upper end and the lower lid is swung downwardly as it is opened about a lower end.

Preferably, the upper lid is connected with the lower lid through the connecting means, which is resilient material. The upper and lower lids are urged against each other by virtue of tensional force of the connecting means.

The connecting means is arranged in a manner such that one component of force is produced to urge the upper end of the upper lid and the lower end of the lower lid against the instrument panel, and another component of force is produced to urge the upper lid and the lower lid against each other.

The lid means is preferably provided with lock means for locking the lid means against the instrument panel. The lid means may further be provided with unlock means for unlocking and removing the lid means from the instrument panel.

The air bag system is provided with bracket means for combining the upper lid and lower lid to form a single unit.

In a preferred embodiment, the connecting means connects the upper lid with the lower lid and urges resiliently in one direction. The bracket means supports the upper and lower lid commonly in a direction opposite to the connecting means. The connecting means and the bracket means are associated with each other to form the single unit of the lid means. Preferably, stopper means is provided around the opening on the instrument panel for receiving the lid means.

BRIEF DESCRIPTION OF THE DRAWING

FIG. 11 is a partially sectional view showing a fastener;

FIG. 12 is a side view showing a retainer;

FIG. 13 is a sectional view of the lid;

FIG. 14 is a sectional view similar to FIG. 8 but showing still another embodiment;

DESCRIPTION OF THE PREFERRED EMBODIMENT

Figure 1:
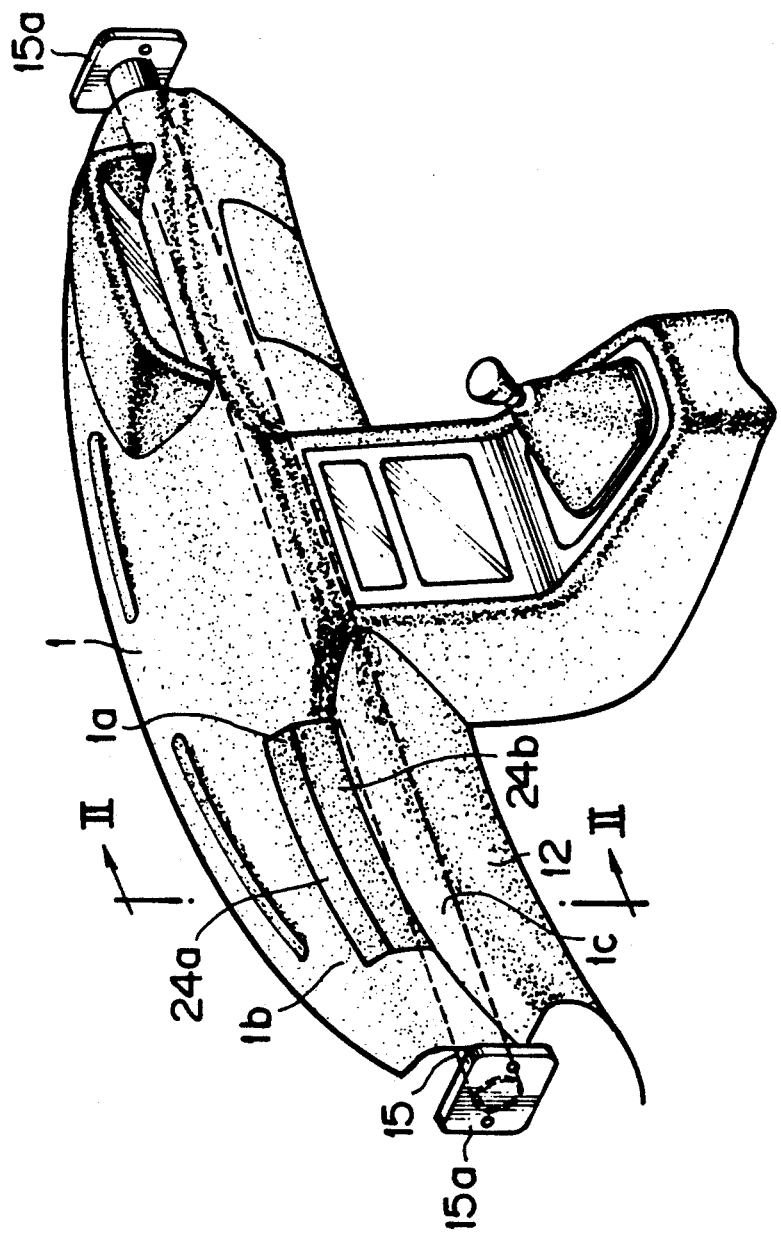
FIG. 1 is a perspective view of a front portion of a passenger compartment of a vehicle to which the present invention can be applied.

FIG. 1 is a perspective view showing a front inside view of a passenger compartment of a vehicle to which the present invention can be applied.

Figure 2:
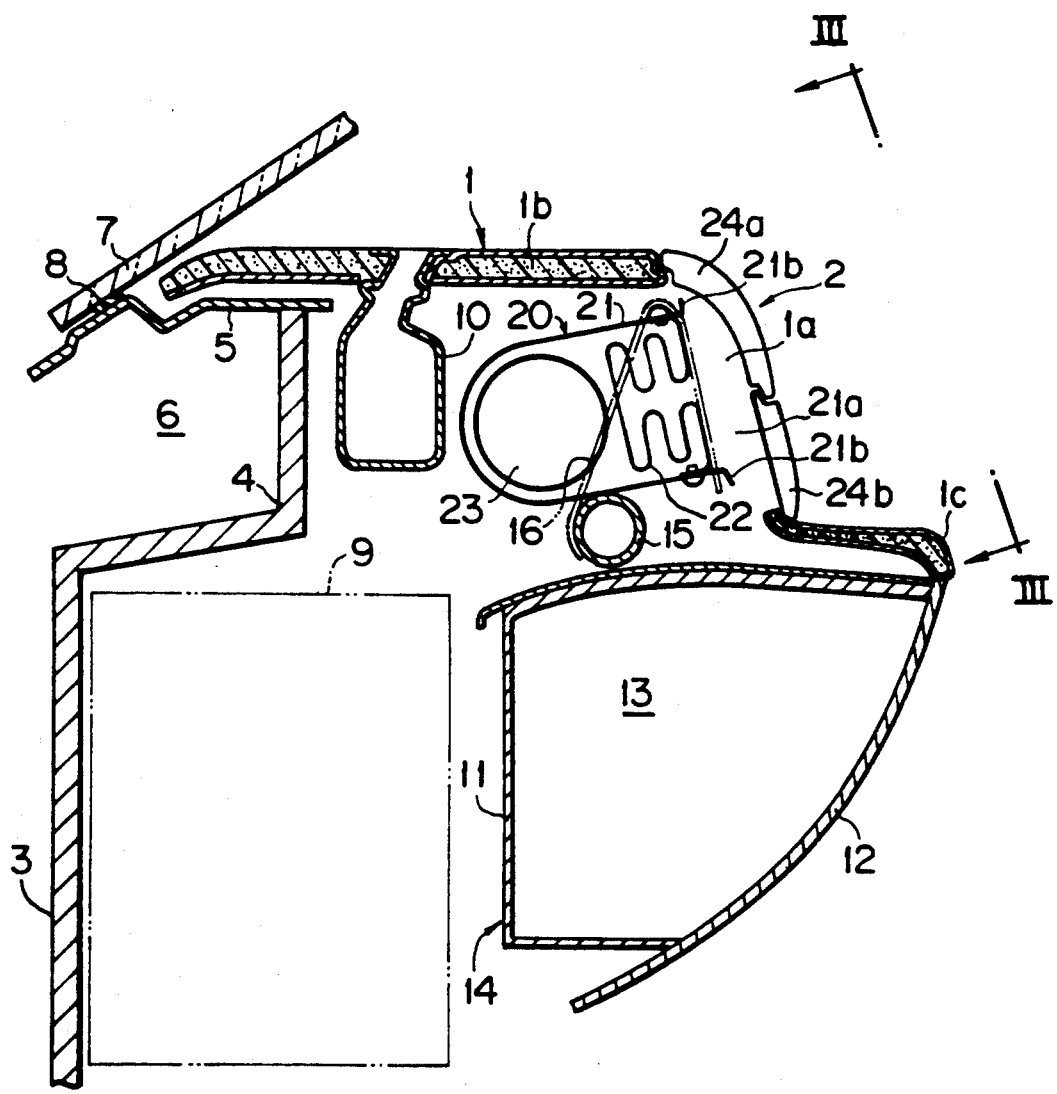
FIG. 2 is a sectional view along a line II—II in the FIG. 1.

FIG. 2 is a sectional view taken along a line II—II of FIG. 1. An instrument panel 1 is arranged to partly define a front portion of a passenger compartment of the vehicle. The instrument panel 1 is formed with an opening 1a formed between a top deck 1b and a side wall 1c of the instrument panel and extending transversely of the vehicle. The opening 1a is located in the vicinity of an assistant driver's seat. An air bag system 2 is incorporated in the front portion of the passenger compartment adjacent to the opening 1a.

As shown in FIG. 2, a dash lower panel 3 is disposed at a rear end of an engine room of the vehicle. A dash upper panel 4 is connected with an upper end of the dash lower panel 3. A cowl upper panel 5 is connected with an upper end of the dash upper panel 4 at a rear end thereof. A cowl front panel (not shown) is connected with both a front end of the cowl upper panel 5 and the dash upper panel 4 to define a cowl box 6 forming a closed cross sectioned structure extending transversely.

A front windshield glass 7 is secured to the cowl upper panel 5 by means of an adhesive 8.

A cooling unit 9, such as an air conditioner, is disposed rearward of the dash lower panel 3 and under the dash lower panel 4. Thus, the cooling unit 9 is located in a space defined by the instrument panel 1.

A defroster nozzle 10 is disposed beneath the top deck 1b of the instrument panel 1. The defroster nozzle 10 supplies air from the cooling unit 9 toward the front windshield glass 7 so as to demist the glass.

A glove compartment 14 is defined by a glove tray 11, a glove lid 12 and a glove pocket 13 rearward of the cooling unit 9.

A steering support member 15 is arranged rearward of and above the cooling unit 9. The steering support member 15 extends transversely and is connected with hinge pillars (not shown) at opposite ends thereof through brackets 15a. The steering support member 15 is connected with the instrument panel through a joint member (not shown).

To the steering support member 15 is fixed a bracket 16 on which an air bag unit 20 of the air bag system 2 is mounted.

As shown in FIG. 2, the air bag unit 20 is provided with a casing 21 having an opening 21a toward the opening 1a of the instrument panel 1 and a flange portion 21b around the opening 21a, an air bag 22 folded in the casing 21, a gas inflater 23, an upper lid 24a and a lower lid 24b as a cover member covering the opening 1a of the casing 21.

Figure 3:
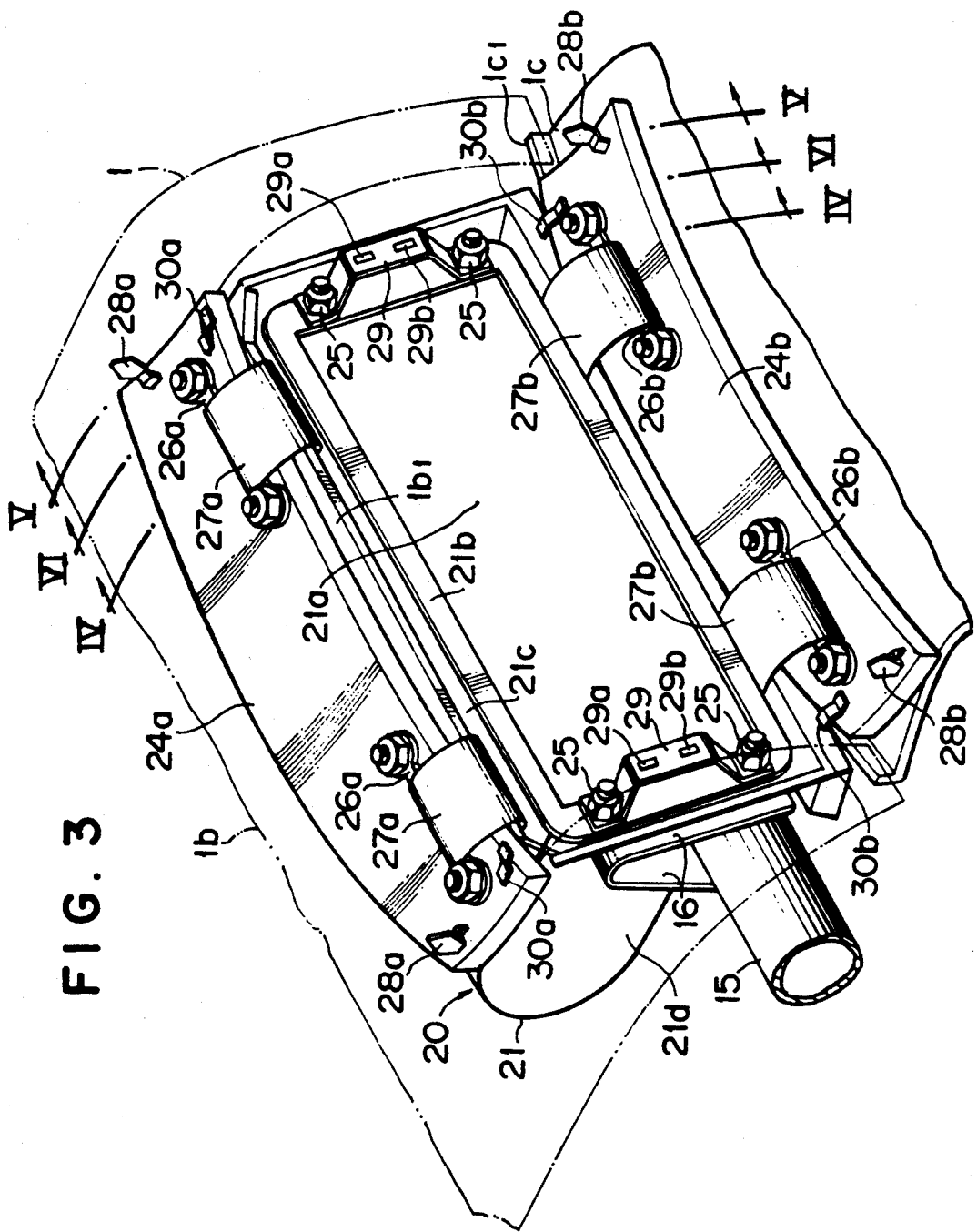
FIG. 3 is a view seen from a line III—III of an air bag unit of FIG. 2 when the lid is opened.

As shown in FIG. 3 which is a perspective view seen from a line III—III in FIG. 2 the air bag unit 20 is fixed to the steering support member 15 in a manner such that the flange portion 21b of the casing 21 is joined with the bracket 16 by bolt and nut 25 at opposite ends in the transverse direction.

Figure 4:
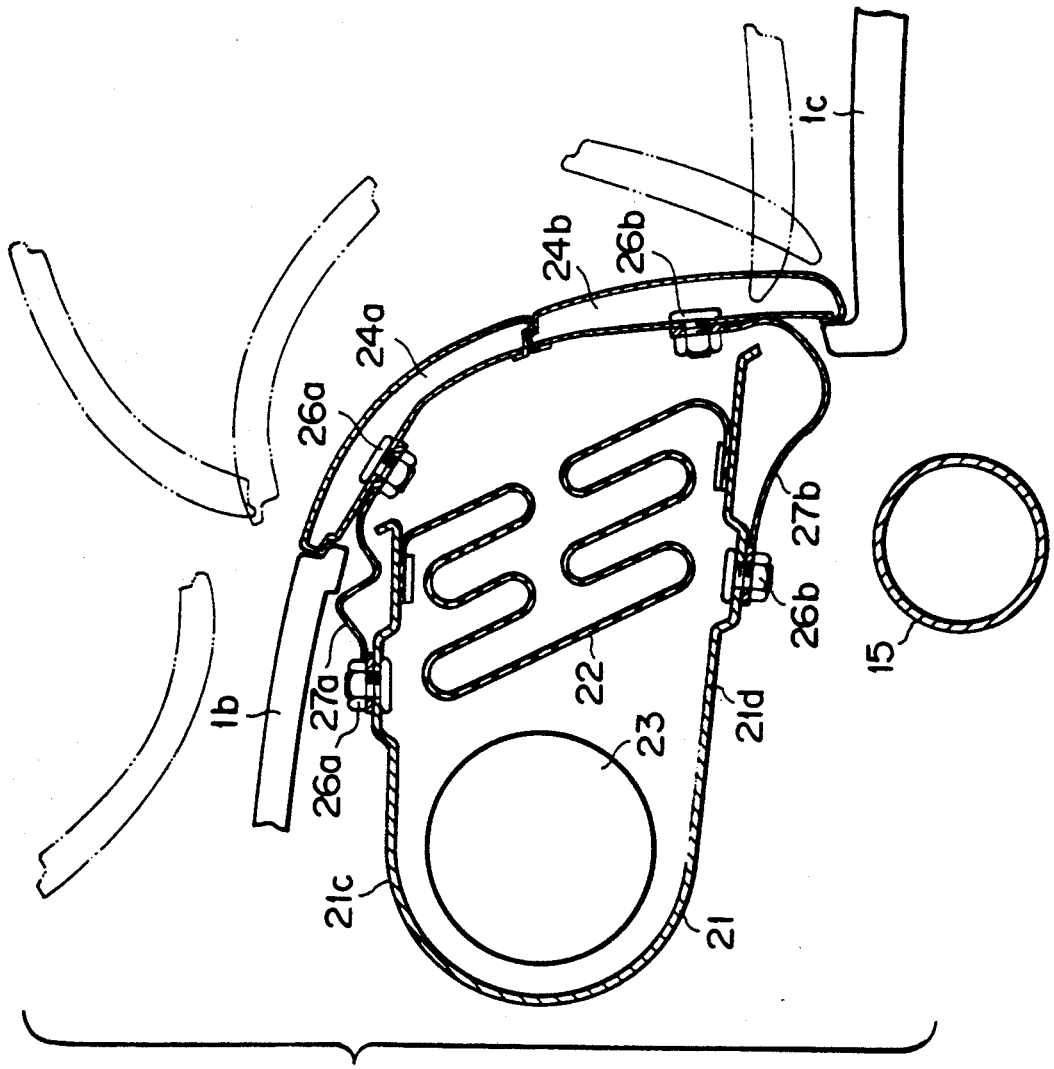
FIG. 4 is a sectional view along a line IV—IV in FIG. 3.

Referring to FIG. 3, and to FIG. 4, which is a sectional view along a line IV—IV in FIG. 3, a pair of upper belt members 27a is connected with transversely spaced opposite end portions of a top plate 21c of the casing 21 at first ends of the belt members 27a through joint members 26a, respectively. The belt members 27a are pivotable about a transverse axis defined by the joint members 26a at the first ends. The other, or second, ends of the belt members 27a are connected with transversely spaced counterparts of the upper lid 24a through joint members 26a. The belt members 27a are also pivotable at the other ends about a transverse axis defined by the joint members 26a. The belt members 27a are flexible in a longitudinal direction of the vehicle. Similarly, a pair of lower belt members 27b are connected with transversely spaced opposite end portions of a bottom plate 21d of the casing 21 at first ends of the belt members 27b through joint members 26b respectively. The belt members 27b are pivotable about a transverse axis defined by the joint members 26b the one ends. The other ends of the belt members 27b are connected with transversely spaced counterparts of the lower lid 24b through joint members 26b. The belt members 27b are pivotable at the other ends about a transverse axis defined by the joint members 26b. As shown in FIG. 4, the belt member 27a has a length much greater than a distance between joint portions of the belt members 27a or between the joint members 26a on the top plate 21c and the upper lid 24a when the upper lid 24a is in a closed position. Similarly, the lower belt member 27b has a length much greater than a distance between joint portions of the belt members 27b or between the joint members 26b on the bottom plate 21d and the lower lid 24b when the lower lid 24b is in a closed position.

Figure 5:
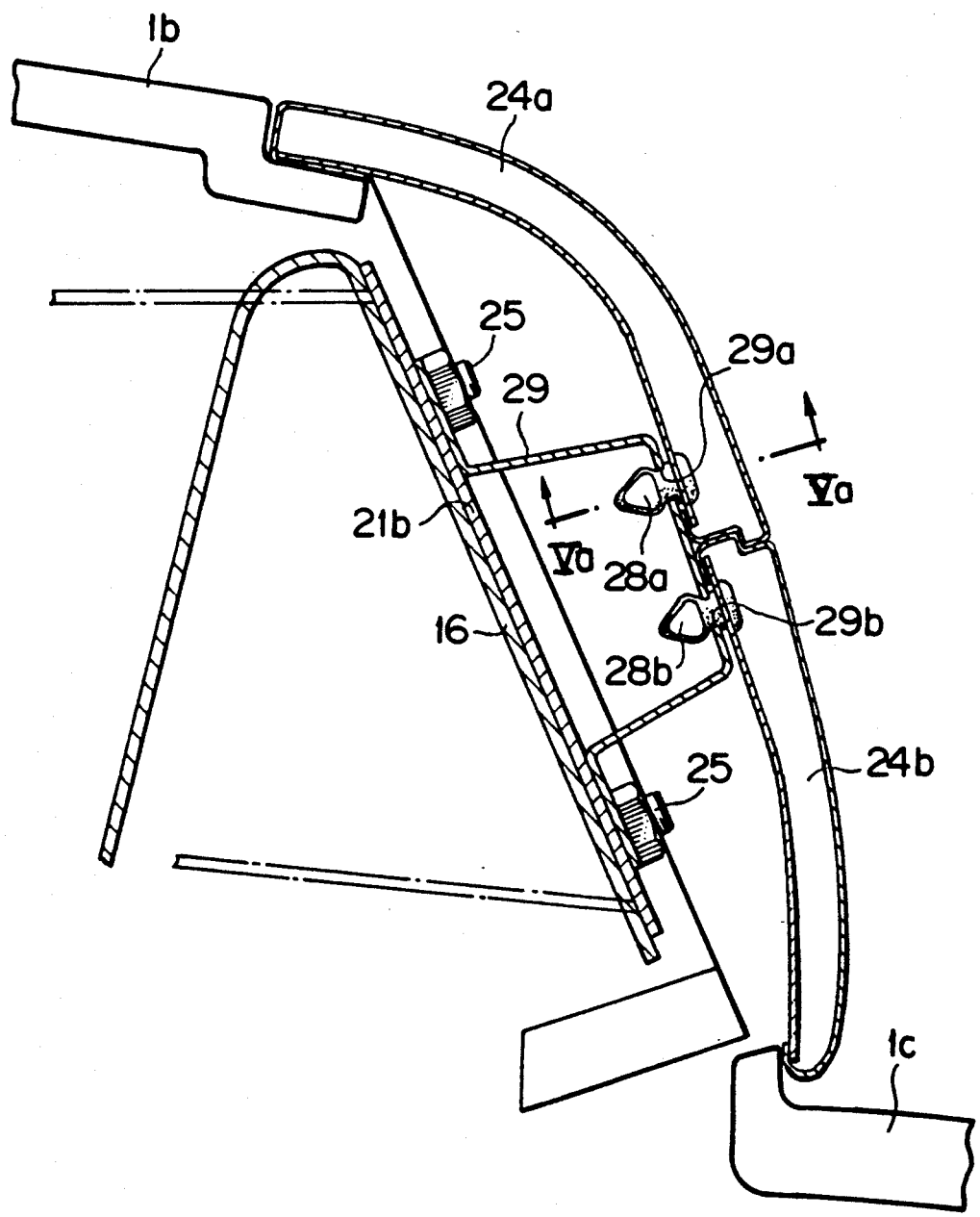
FIG. 5 is a sectional view along a line V—V in FIG. 3.

Referring further to FIG. 5, which is a sectional view taken from a line V—V in FIG. 3, a pair of fasteners 28a and 28b are disposed at transversely opposite ends of the lids 24a, 24b. A bracket 29 is mounted on transversely opposite ends of the flange portion 21b of the casing 21 through the bolts and nuts 25. The fasteners 28a and 28b are engaged with holes 29a and 29b respectively formed on the bracket 29 when the lids 24a and 24b are closed.

Figure 5A:
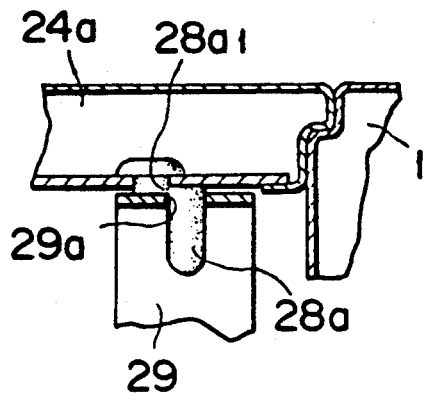
FIG. 5a is a view seen from a line Va—Va in FIG. 5.

As shown in FIG. 5a, which is a sectional view seen from a line Va—Va in FIG. 5, the fastener 28a is offset from the hole 29a in the transverse direction so that the fastener 28a is formed with a reduced or weakened portion $28a_1$. Similarly, the fastener 28b is formed with a weakened portion.

Figure 6:
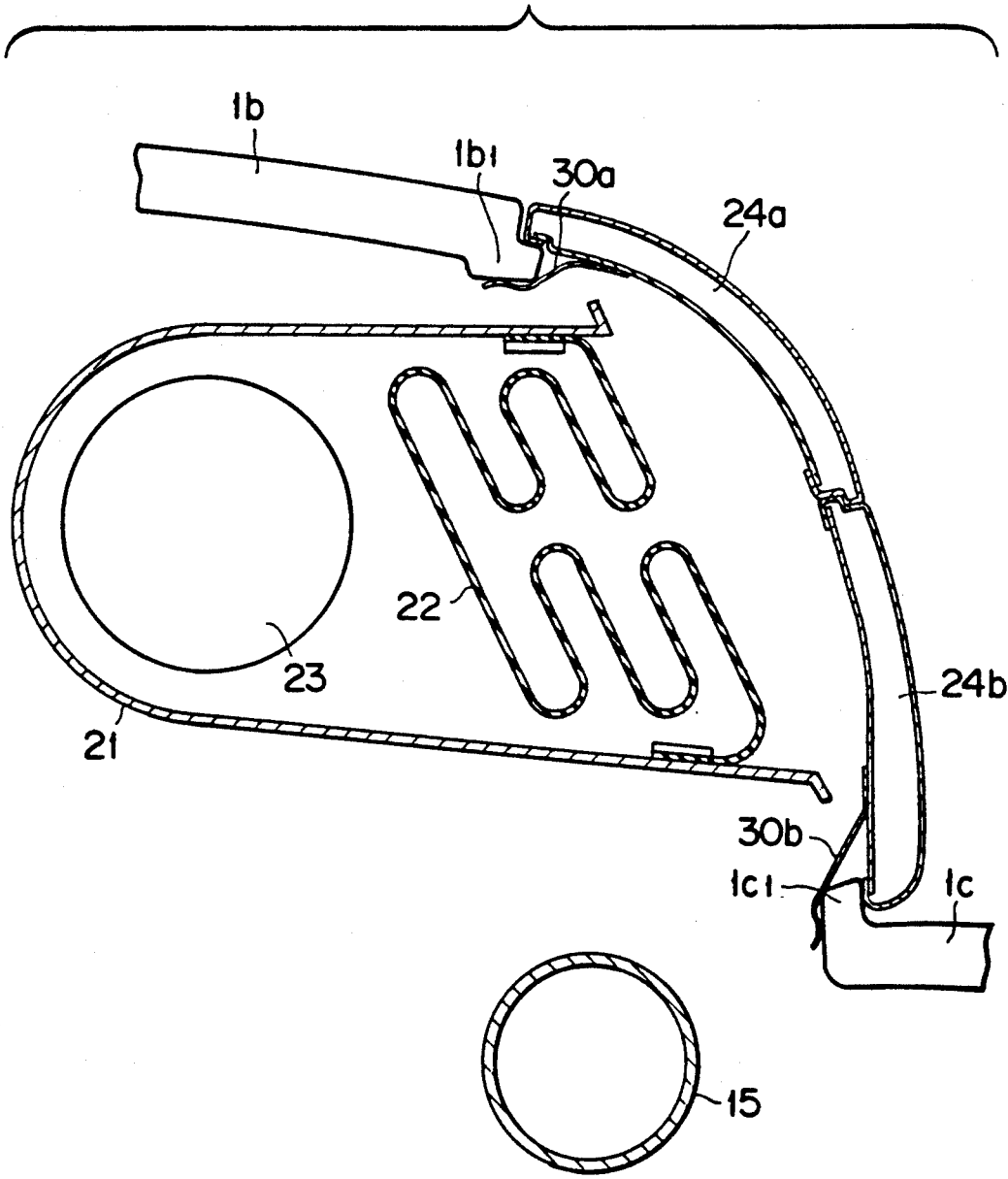
FIG. 6 is a sectional view along a line VI—VI in FIG. 3.
Figure 7:
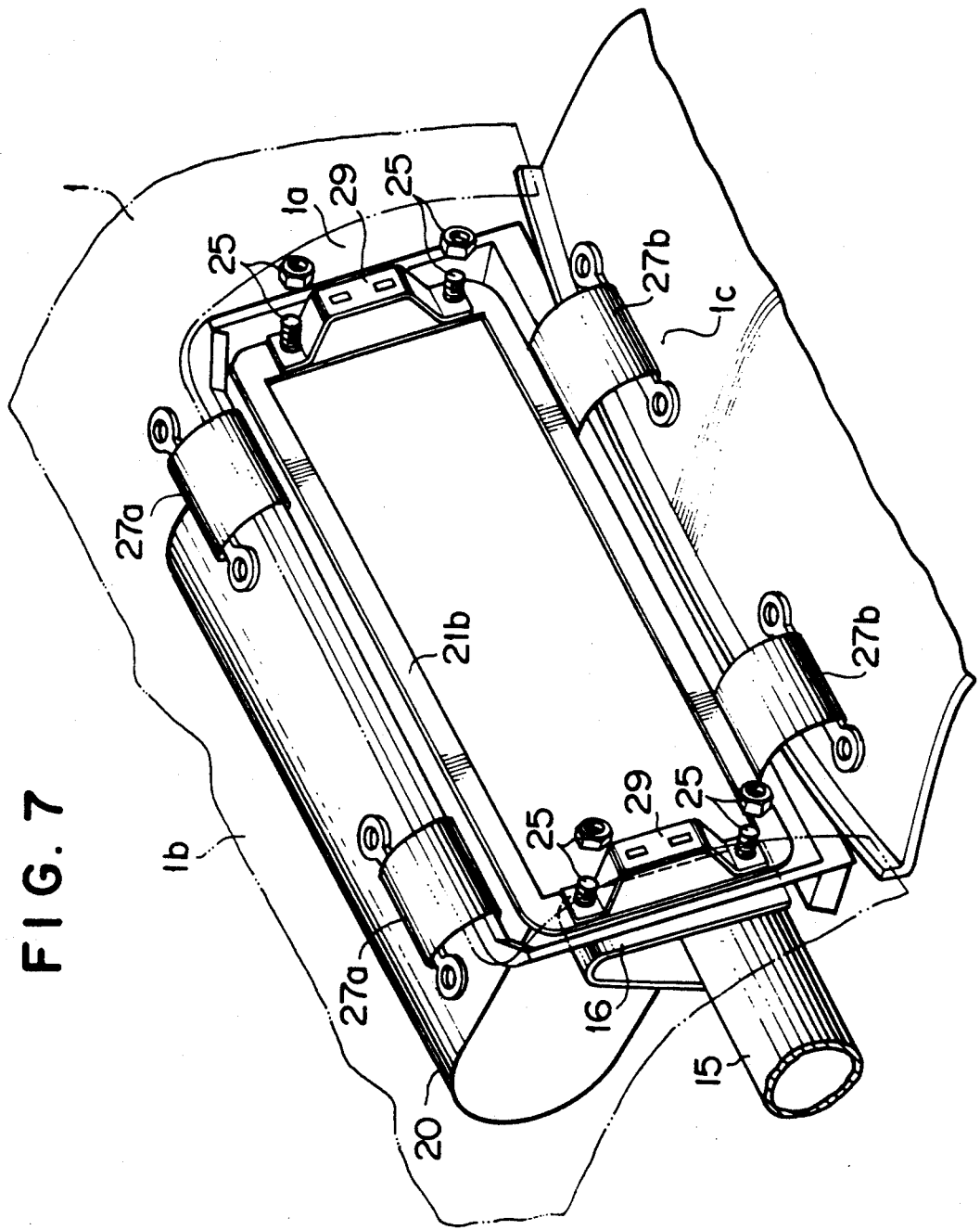
FIG. 7 is a perspective view showing an air bag unit without the lid.

Referring further to FIG. 6, which is a sectional view along a line VI—VI, clips 30a are mounted on an upper end of the upper lid 24a at transversely opposite ends. Similarly, clips 30b are mounted on a lower end of the lower lid 24b at transversely opposite ends. The clips 30a and 30b are brought into engagement with lower end $1b_1$ of the top deck 1b of the instrument panel 1 and with upper end $1c_1$ of the side wall 1c of the instrument panel respectively after the lids 24a and 24b are closed.

In operation, when a collision occurs against the vehicle, a collision sensor (not shown) senses the collision so that an igniter is ignited to fire a chemical compound in the inflator. Gas generated from the chemical compound is introduced into the air bag 22 to be developed. Thus, the passenger seated in the passenger's seat is brought into contact with the inflated air bag so that his or her head and chest are protected.

Figure 5B:
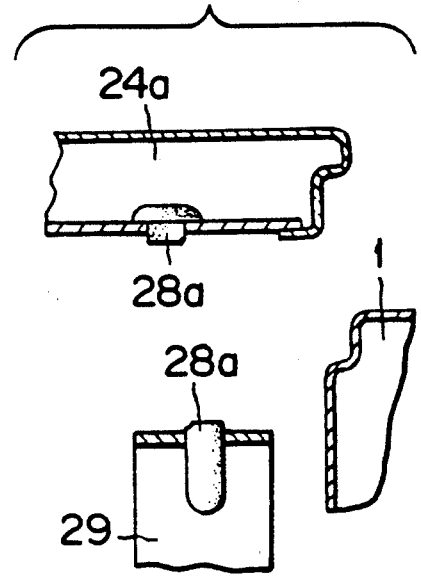
FIG. 5b is a view seen from a line Vb—Vb in FIG. 5 when the lid is opened.

In initial stage of the inflating operation of the air bag 22, as shown in FIG. 5b, the weakened portion 28a is ruptured. Thereafter, the clip 30a is disengaged from the lower end portion $1b_1$ of the top deck 1b of the instrument panel 1. As a result, the upper lid 24a, connected with the top plate 21c of the casing 21 through the belt member 27a, is moved straight from the closed position to a rearwardly spaced position by a certain distance, and thereafter, is swung upwardly or counterclockwise about its upper end portion to be overturned and overlapped on the top deck 1b as shown by a dot-dash line in FIG. 4.

Likewise, the lower lid 24b is moved straight from the closed position to a rearwardly spaced position by a certain distance, and thereafter, is swung downwardly or clockwisely about its lower end portion to be overturned and overlapped on the side wall 1c as shown by a dot-dash line in FIG. 4.

As mentioned, as the air bag 22 is inflated, the lids 24a and 24b are disengaged from the instrument panel 1 so as to be readily opened even where the instrument panel is rearwardly arcuate.

The belt members 27a, 27b are flexible in the longitudinal direction. Therefore, no undue stress is produced in the fasteners 26a, 26b, or other members such as the top plate 21c, bottom plate 21d, lids 24a and 24b and the like.

As shown in FIG. 5b, the fastener 28a is ruptured at the weakened portion $28a_1$ in the initial stage of the inflation of the air bag 22 to be divided into two parts. One of the two parts is moved together with the lid 24a and the other remains on the bracket 29 so that the fastener 28a is not projected from the lid 24a, unlike in a conventional structure. Similarly, the faster 28b, as well as the fastener 28a, is not projected from the lid 24b. Consequently, there is no problem in having the fasteners 28a and 28b project so as to hit the passenger as the lids 24a and 24b are opened.

Figure 5C:
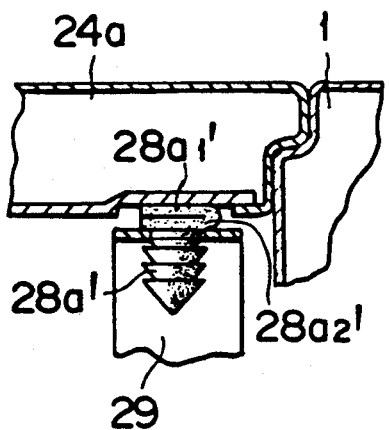
FIG. 5c is a similar view to FIG. 5a but showing a different structure of the fastener.
Figure 5D:
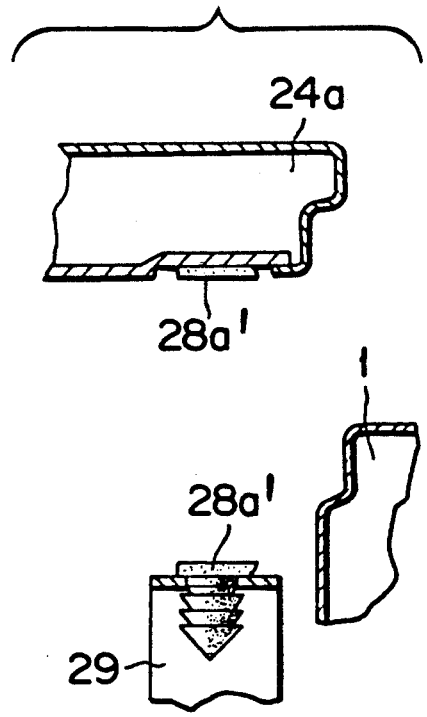
FIG. 5d is a similar view to FIG. 5b but showing a different structure of the fastener.

Referring to FIG. 5c, there is shown another embodiment of the fastener. According to the illustrated embodiment, a fastener 28a' is formed with a U-shaped portion $28a_1'$ having a bent portion $28a_2'$ which defines a weakened portion. As shown in FIG. 5d, in the initial stage of the development of the air bag 22, the weakened portion $28a_2'$ is subjected to a tensional force from the lid 24a so that the fastener $28a_1$ is ruptured at the bent portion $28a_2'$. As a result, the fastener $28a_1$ is divided into two parts in the same manner as the former embodiment so that the fasteners 28a are not projected from the lid 24a as it is opened.

Hereinafter, a method for mounting the air bag system into the vehicle body is described, making reference with FIGS. 1, 3, and 5 through 7.

Firstly, the instrument panel is fixed to the body member through the brackets 15a disposed at transversely opposite ends of the steering support member 15. At this stage, the lids 24a and 24b are not mounted on the instrument panel 1 although they are illustrated in FIG. 1.

Secondly, the air bag unit 20 with the belt members 27a and 27b are inserted into the space defined by the instrument panel 1 through the opening 1a. The flange portion 21b together with the bracket 29 is fixed at transversely spaced opposite end portions to the bracket 16 which is fixed to the steering support member 15 by means of the bolt and nut 25.

Thirdly, the belt 27a, is connected through the fastener 26a, with the upper lid 24a on which the fasteners 28a and the clips 30a are already mounted as shown in FIG. 3. Likewise, the belt 27b is connected through the fastener 26b with the lower lid 24b on which the fasteners 28b and the clips 30b are already mounted.

Fourthly, the clips 30a for the upper lid 24a are engaged with the lower end $1b_1$ of the top deck 1b of the instrument panel and the clips 30b for the lower lid 24b are engaged with the upper end $1c_1$ of the side wall 1c of the instrument panel 1. Thereafter, the lid 24a is swung in the clockwise direction in FIG. 6 and the lower lid 24b is swung in the counterclockwise direction so that the fasteners 28a and 28b are engaged with the holes 29a and 29b to maintain the lids 24a and 24b at the closed positions respectively. The air bag unit 20 is mounted through the opening 1a on the instrument panel 1, which is already assembled into the body. Thus, it is easy to position the air bag unit 20 and the instrument panel 1 when mounting the air bag unit 20 on the instrument panel 1.

Hereinafter, another embodiment of the present invention is described.

Figure 8:
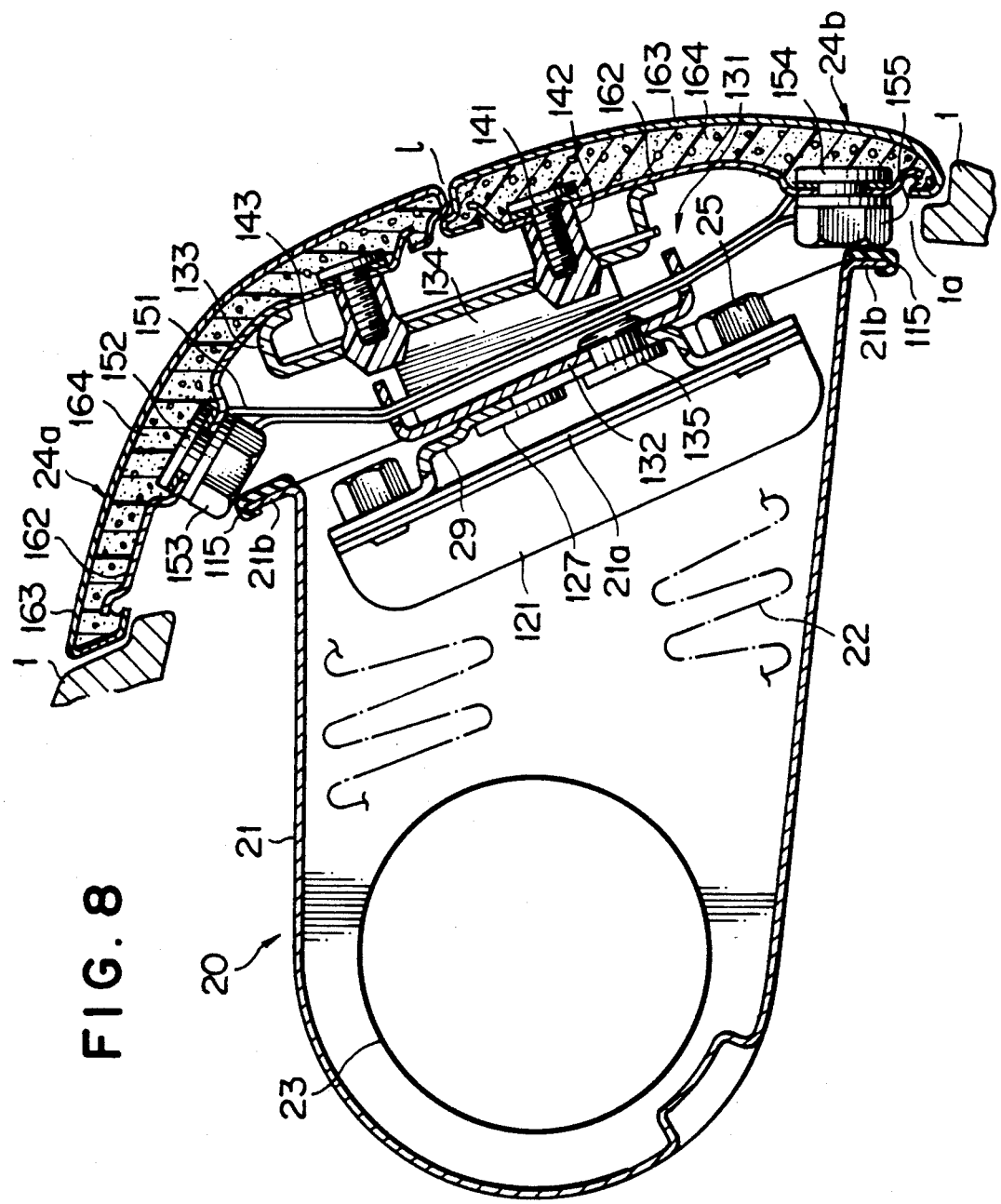
FIG. 8 is a sectional view similar to FIG. 2 but showing an air bag system in accordance with another embodiment.

Referring to FIG. 8, in the illustrated structure, the lid 24 is of an arcuate configuration which is projected forwardly an intermediate portion.

Figure 9:
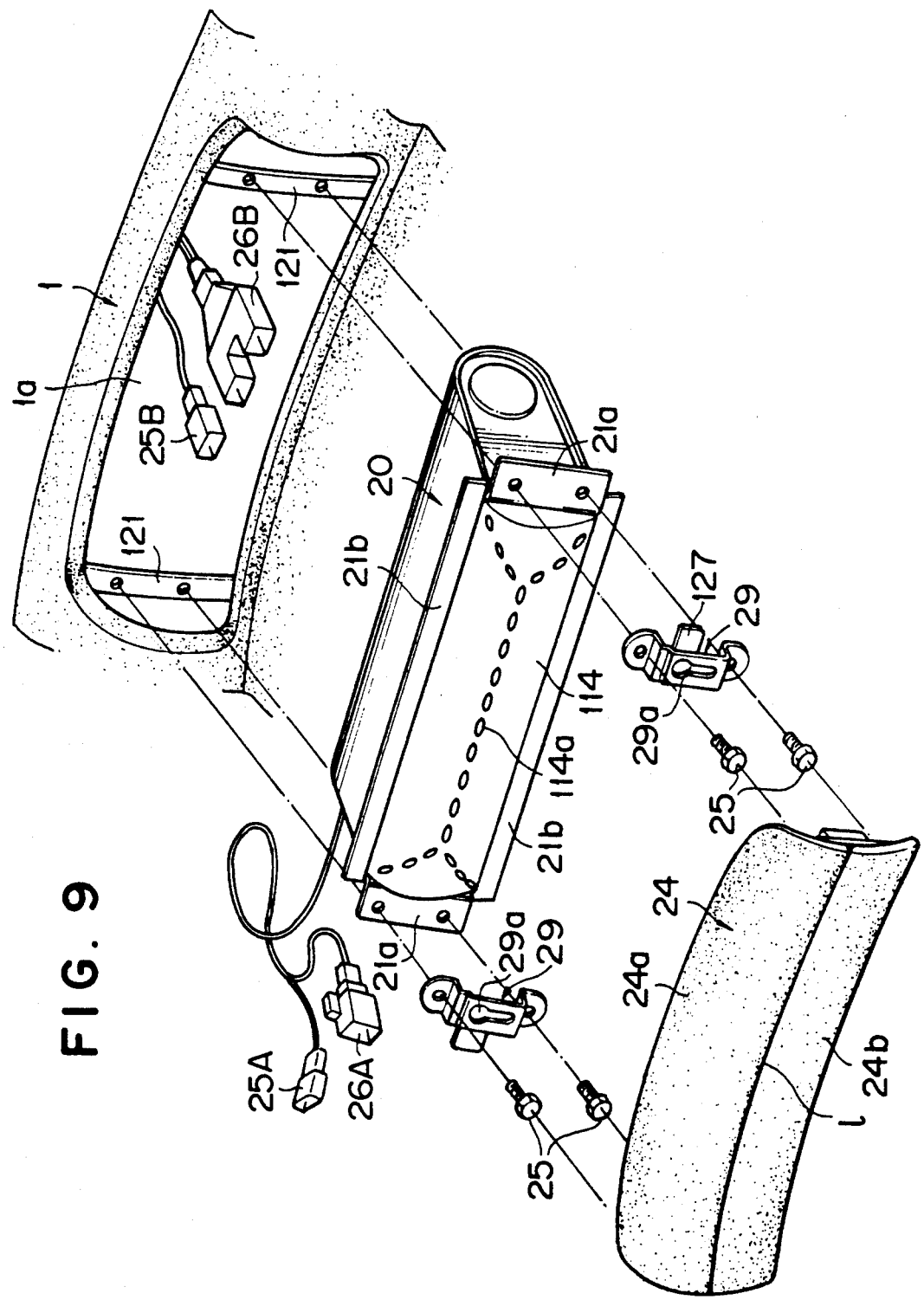
FIG. 9 is an exploded perspective view of the air bag system.

As shown in FIG. 9, the opening of the casing 21 is covered by a film 114 formed with perforations 114a. Within the space defined by the instrument panel 1, a pair of brackets 121 are disposed at the transversely opposite sides of the opening 1a. The brackets 121 are mounted on the steering support member 15. The casing 21 of the air bag unit 20 is formed with a pair of side flange portions 21a at the opposite sides of the opening 1a. The casing 21 of the air bag unit 20 is also formed with a pair of up and down flange portions 21b upward and downward of the opening 1a. The air bag unit 20 is joined with the brackets 121 by the side flange portions 21a through the bolt and nuts 25 together with the bracket 29. As shown in FIG. 9, connectors 25A, 25B, 26A and 26B are provided for connecting wires from the air bag unit 20 and from the body member. The lid 24 is dividable at a line 1 into the upper lid 24a and lower lid 24b. The lids 24a and 24b are mounted on the brackets 29 through a pair of holding members 131. The holding member 131 joins the upper and lower lids 24a and 24b with each other to form a single lid unit. The holding members 131 also function as a fastener for mounting the single lid unit on the bracket 29 which is a body member. The pair of holding members 131 are disposed in a mirror image relationship with each other with regard to a vertical axis of the lids 24a and 24b.

The holding member 131 is provided with a first mount plate 132 and second mount plate 133 and joint plate 134 for joining the first and second mount plates 132 and 133. The first and second mount plates 132 and 133 face each other in a spaced relationship and extend in the up and down direction in parallel with each other. In the illustrated embodiment, the plates 132, 133 and 134 are integrally formed. Thus, surfaces of the plates 134 function as a sliding surface for the air bag 22 as it is inflated.

Figure 10:
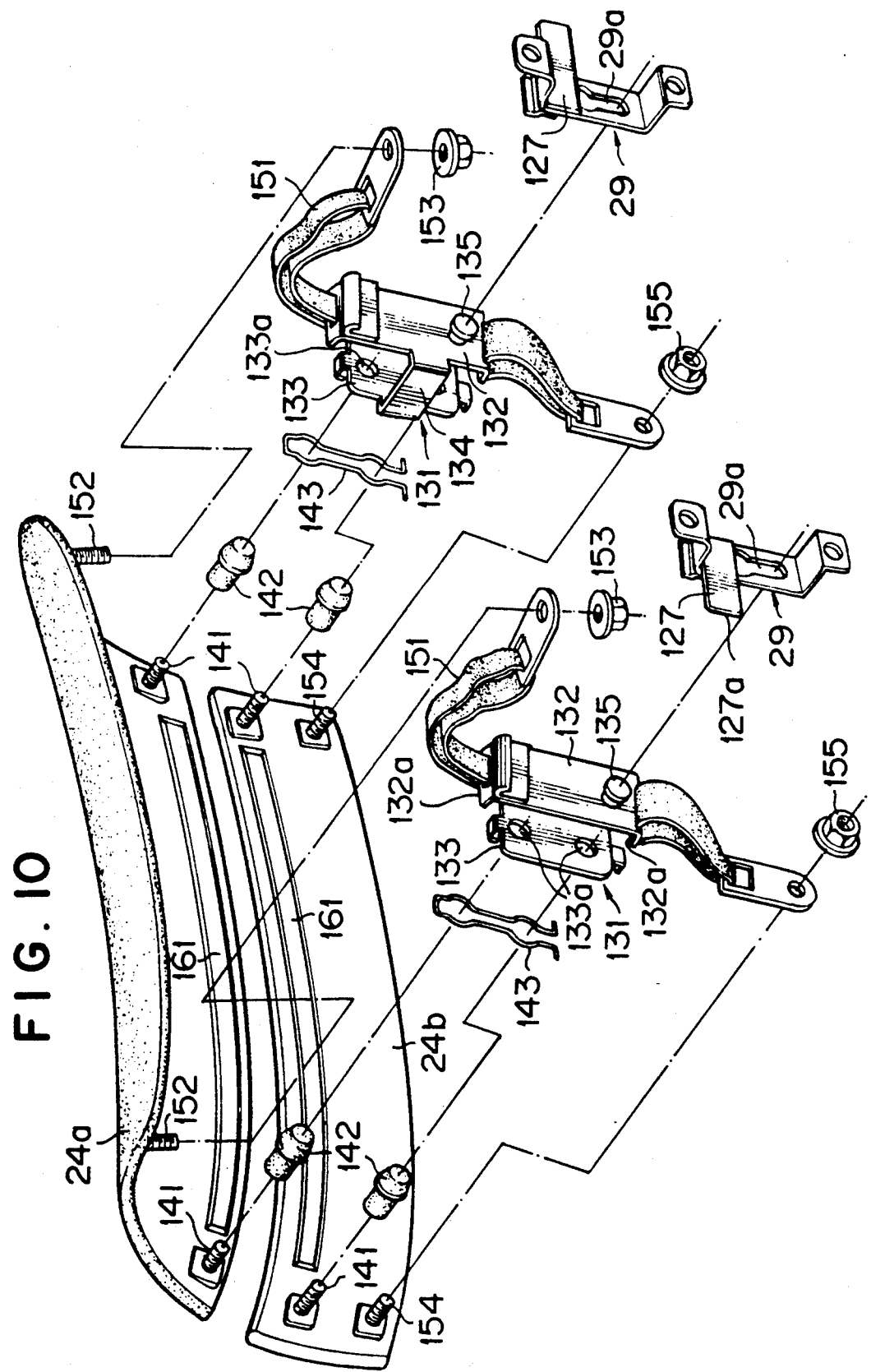
FIG. 10 is an exploded perspective view of the air bag system, specifically showing a single unit of the lid.
Figure 15:
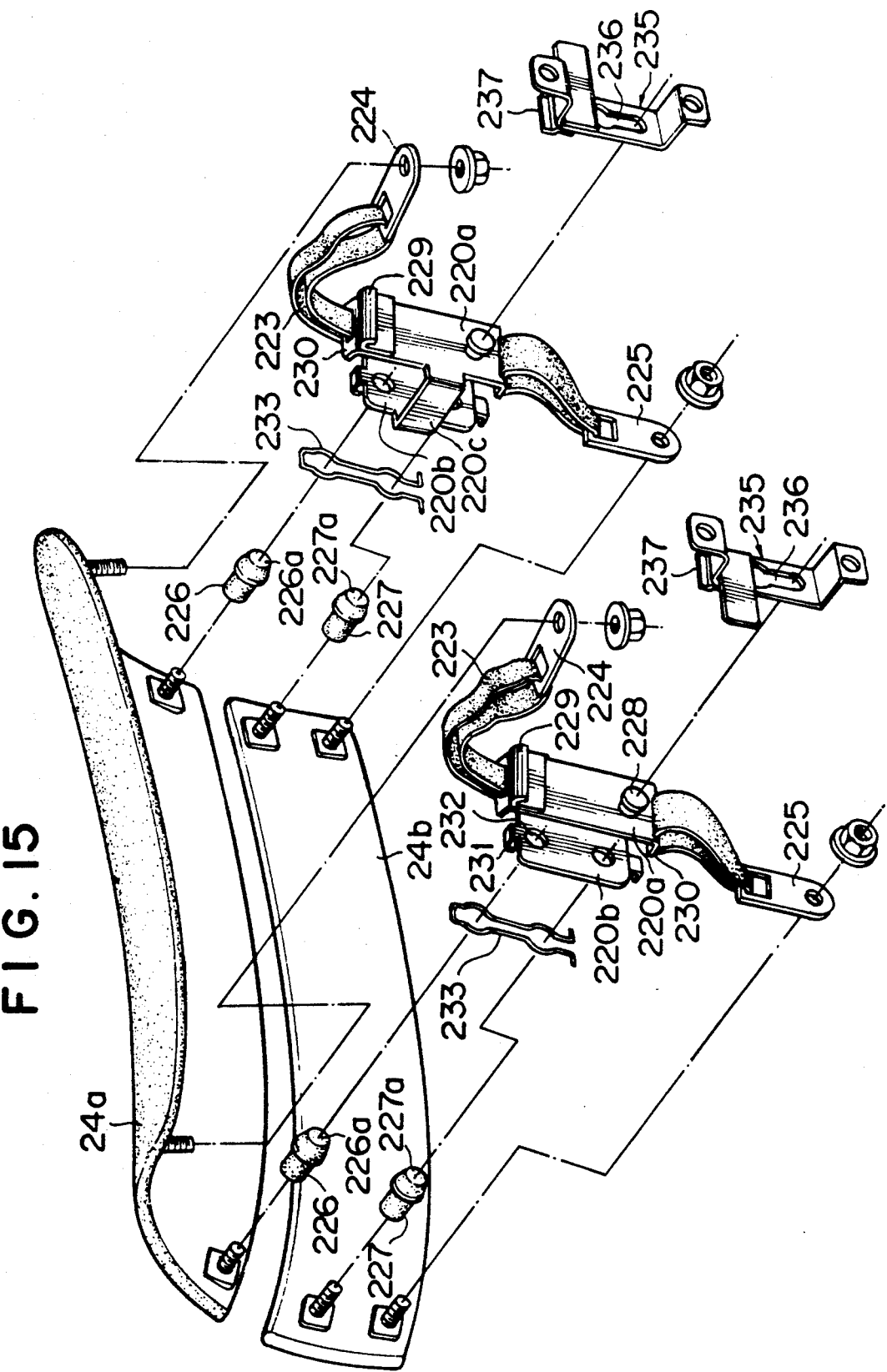
FIG. 15 is an exploded perspective view similar to FIG. 10.
Figure 16:
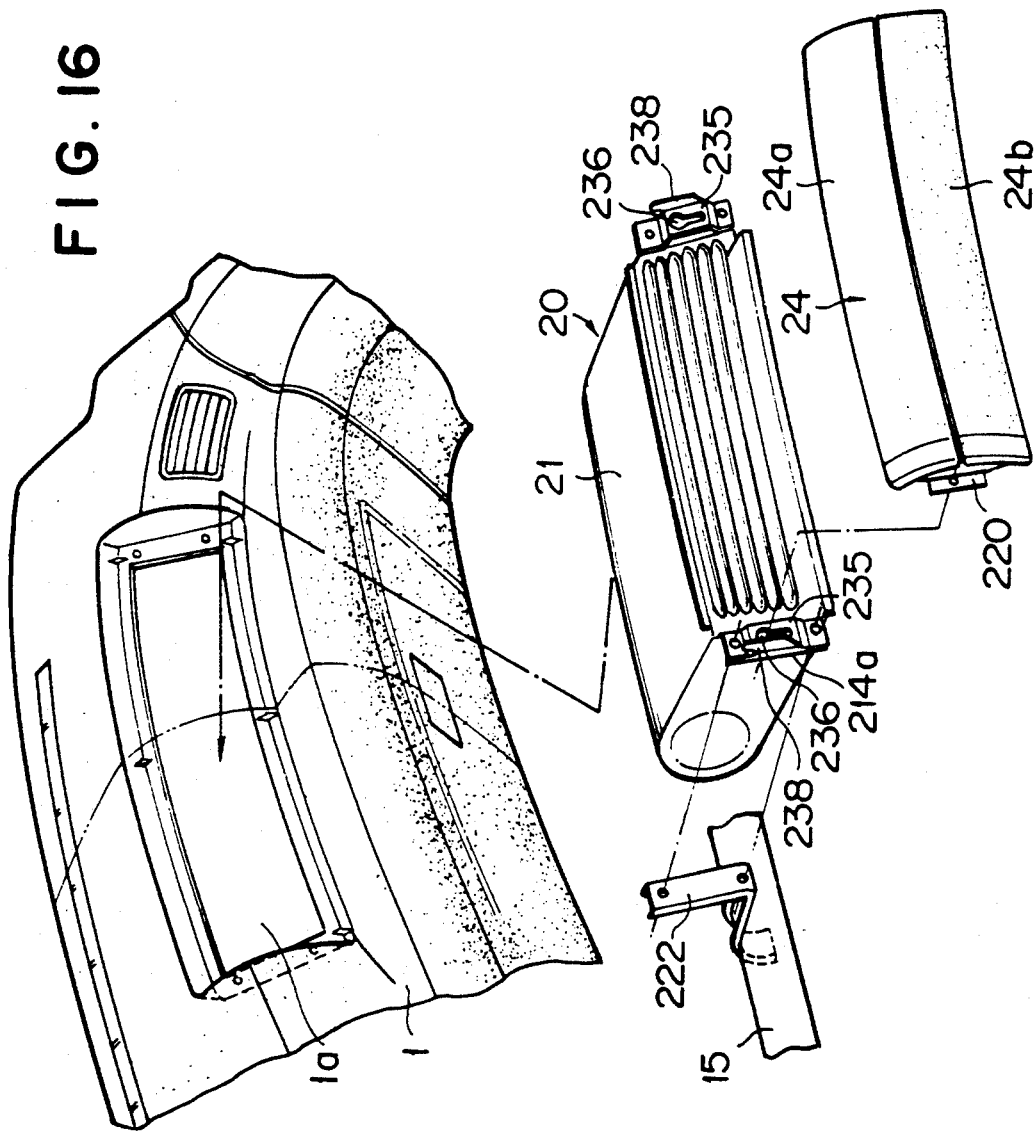
FIG. 16 is an exploded perspective view shown showing a mounting structure of the air bag unit.
Figure 17:
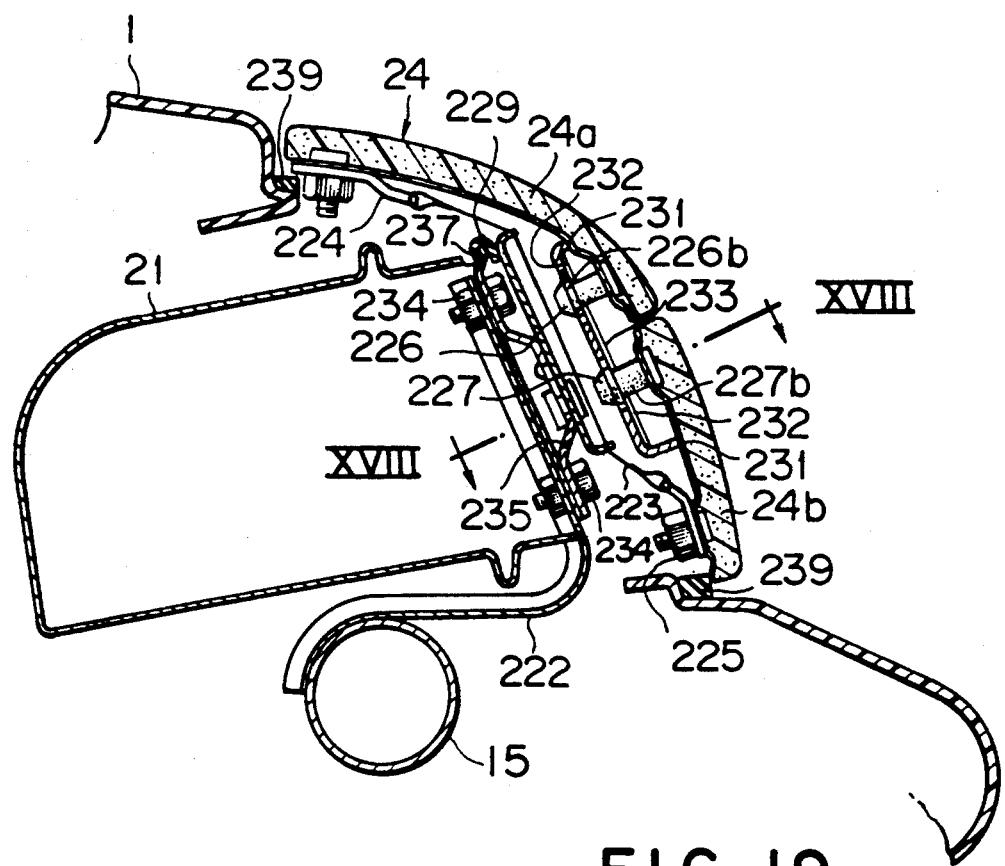
FIG. 17 is a sectional view after assembling the air bag system.
Figure 19:
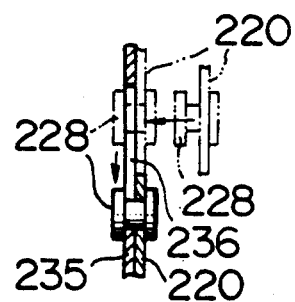
FIG. 19 is a sectional view of a fastener.
Figure 18:
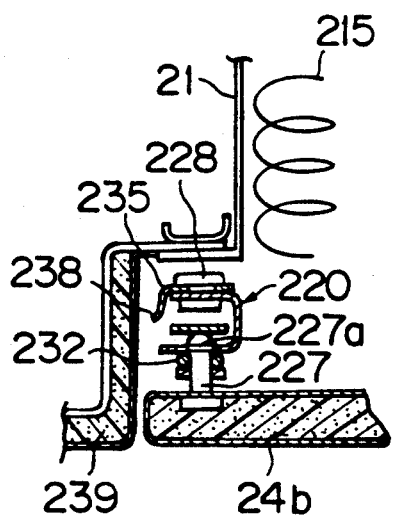
FIG. 18 is a sectional view along a line XVIII—XVIII in FIG. 17.
Figure 20:
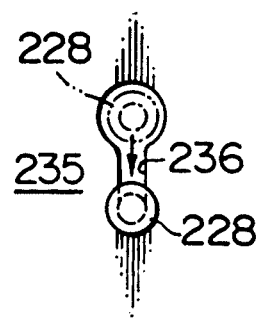
FIG. 20 is a side view of the fastener of FIG. 19.

The mount plate 132 is provided with an engaging pin 135 having an enlarged head portion. The bracket 29 is formed with an engaging hole 29a having a large circular portion and small circular portion or small elongated portion. The pin 135 is adapted to engage with the bracket through the hole 29a. The pin 135 can be inserted into the hole 29a through the large circular portion. When the pin 135 is moved to the small circular portion of the hole 29a, the mount plate 132 is fixed to the bracket 29 through the pin 135. As illustrated in FIG. 10, a stopper 127 is disposed to cover the large circular portion of the hole 29a. The stopper 127 is made of a resilient material and extends transversely. One end of the stopper 127 is fixed to the 10 bracket 29 and the other end or free end 127a of the stopper 127 is of a length that the stopper 127 extends slightly beyond the opposite side ends of the lids 24a and 24b. The stopper 127 allows the pin 135 to pass through the large circular portion of the hole 29a by resiliently displacing away from the hole 29a. However, once the pin 135 is moved to the small circular portion of the hole 29, the stopper 127 prevents the pin 135 from returning to the large circular portion of the hole 29. In order to disengage the pin 135 from the hole 29, the free end 127a of the stopper 127 is the pin 135 to move upwardly to the large circular portion of the hole 29a. An appropriate tool such as screw driver is inserted into a clearance between the instrument panel 1 and the lid 24 so that the free end 127a of the stopper 127 can be displaced away or forwardly from the bracket 29 and to enable the pin 135 to be disengaged from the bracket 29.

The upper and lower lids 24a and 24b are connected with the second mount plate 133. For this purpose, the lids 24a and 24b are provided with bolts 141 projecting forwardly at transversely spaced opposite end portions respectively. The lids 24a and 24b are fixed to the second mount plate 133 through the engaging pin 142 screwed onto the bolt 141. The pin 142 is formed with a tapered and enlarged portion and is loosely inserted into an engaging hole 133a. The pin 142 is prevented from being disengaged from the engaging hole 133a by virtue of an engaging pin 143 of a substantially U-shaped wire material.

The engaging pin 143 is provided with a pair of leg portions 143a facing each other and a joint portion 143b. Each leg portion 143a is provided with a pair of arcuate portions in a spaced relationship. The arcuated portions form a pair of enlarged engaging portions 143. Each engaging portion 143c has a diameter less than that of the enlarged portion of the pin 142. The pin 143 is disposed in contact with the second mount plate 133 with the hole 133a of the second mount plate 133 being aligned with the engaging hole 133a. Preferably, the pin 143 is mounted on the second mount pin 143 through a fastening plate 144. When an inflating force from the air bag 22 is applied to the engaging mechanism utilizing the pins 143 and 142, the pin 142 is disengaged from the second mount plate 133 to enable the lids 24a and 24b to be opened. Therefore, it is not necessary to provide the pin 143 if the pin 142 is engaged with the engaging hole 133a enough to be engaged with the bolt 141.

The first mount plate 132 is formed with a pair of upper and lower openings 132a to which a rubber band 151 is inserted. An upper end of the rubber band 151 is connected with a bolt 152 projected from the upper lid 24a and located at an upper corner portion of the lid 24a through a nut 153. A lower end of the band 151 is connected with a bolt 154 projected from the lower lid 24b and located at a lower corner portion of the lower lid 24b through a nut 155.

The bands 151 urges the corner portions of the lids 24a and 24b toward the body member so that the lids 24a and 24b are surely positioned against the instrument panel 1 and align with the opening 1a. In addition, the bands 151 function as hinge mechanisms as the lids 24a and 24b are opened. The lids 24a and 24b are finally assembled into the body member as shown in FIG. 8.

After the air bag unit 20 is assembled into the body member, the lid 24, as a single unit, is assembled by engaging the pin 35 of the first mount plate 32 with the bracket 29 through the hole 29a.

As the air bag 22 is inflated, the lids 24a and 24b are separated from each other at the line 1. The upper lid 24a is swung upwardly about the upper edge portion thereof. The lower lid 24b is swung downwardly about the lower edge portion. Although the lids 24a and 24b have arcuate configurations with the transversely opposite ends projected rearwardly or toward the passenger compartment, the lids 24a and 24b can be smoothly opened because of resilient deformation of the bands 151.

For inspection of the air bag system, a screw driver and the like is inserted into the clearance between the side end of the lid 24 and the lid 24 is moved slightly upwardly while urging the stopper 127. Thereafter, the lid 24 is moved rearwardly or toward the passenger compartment so that the lid 24, as a single unit, can be removed from the body.

The lids 24a and 24b are not supported by a body member in the vicinity of the line 1. In order to reinforce the lids 24a and 24b in the vicinity of the line, the illustrated lids 24a and 24b are formed with a projected portion 161 extending transversely close to the line 1. In particular, as shown in FIG. 13, the projected portion 161 is formed on a reinforcement 162 of a relatively hard material such as metal plate constituting a back surface of the lid 24. The lid 24 is comprised of a face member 163 of a relatively soft material such as a plastic constituting a front surface of the lid 24. The reinforcement 162 and the face member 163 are associated to form a substantially closed space in which a foam material is filled to form a foam layer 164.

As shown in FIG. 8, the transversely spaced opposite ends of the lid 24 are brought into contact with the casing 21 to be prevented from being deformed forwardly. The upper and lower flange portions 21b are covered with a resilient member 115 with which the nut 153 and 155 for fixing the band 151 is brought into contact.

Hereinafter, there is described still another embodiment of the present invention referring to FIGS. 14 through 22.

In the air bag system 2, the upper lid 24a and lower lid 24b are assembled as a single unit 24 through a bracket 220 which is removably mounted on the steering support member 15 through a mount bracket 222. The upper lid 24a abuts on the upper end of the lower lid 24b at the lower end. The upper end Of the upper lid 24a is connected with the lower end of the lower lid 24b at back side thereof by a resilient belt member 223 with tension. A pair of the belt members 223 are disposed at transversely spaced opposite ends o the lids 24a and 24b and connected therewith through fastening members 224 and 225. Thus, the upper lid 24a and lower lid 24b are urged against each other in the up and down direction.

The upper lid 24a is provided with a pair of projections 226 having an enlarged head portion 226a on the back surface at the lower end portion. Similarly, the lower lid 24b is provided with a pair of projections 227 having an enlarged head portion 227a on the back surface at the lower end portion. The bracket 220 is engaged with the projections 226 and 227, and the belt member 223 to form the single unit 24. The bracket 220 is formed with a pair of plate portions 220a and 220b facing each other and a joint plate portion 220c connecting the plate potions 220a and 220b at one end. Thus, the bracket 220 is of a channel like configuration.

The plate portion 220a is provided with a first engaging portion 228 of a pin like projection having an enlarged head portion and a second engaging portion 229 of a hook like configuration. The plate portion 220a is formed at the upper and lower end portions with holes 230, through which the belt member 223 is engaged with the bracket 220, and bent end portions bent toward the plate portion 220b. The other plate portion is provided with an engaging portion 231 engaged with the back side of the lids 24a and 24b, a pair of holes 232 into which the projections 226 and 227 are inserted and a spring member 233 for urging the projectings 226 and 227. Retainers 226b and 227b are provided for retaining the spring 233 against the projections 226 and 227.

The belt member 223 connects the upper lid 24a with the lower lid 24b and urges them resiliently in one direction. The bracket 220 supports the upper and lower lids 24a and 24b commonly in a direction opposite to the belt member 223.

Referring to FIGS. 16 through 19, opposite side flange portions 21a of the casing 21 are joined with the bracket 222 fixed to the steering support member 15 through fastening members such as bolt nuts 234. A base plate 235 is mounted on the flange portion 214a by the fastening member 234. The base plate 235 is formed with an engaging and elongated hole 236, extending in the up and down direction and having different circular portions which are engaged with the first engaging portion 228 of the plate portion 220a, and an extension 237, extending upwardly for engaging the second engaging portion 229. The base plate 235 is also formed with a guide plate portion 238 extending from one side thereof.

In assembling the lids 24a and 24b, the single unit 24 is inserted into the opening 1a to engage the first and second engaging portions 228 and 229 with the engaging hole 236 of the base plate 235. In this case, the single unit 24 can be easily positioned with regard to the transverse direction by virtue of the guide plate portion 238 formed on a side end of the base plate 235. The instrument panel 1 is provided with a resilient stopper member 239 disposed around the opening 1a. The stopper 239 is engaged with the peripheral portion of the single unit 24 to support it when mounted.

Figure 21:
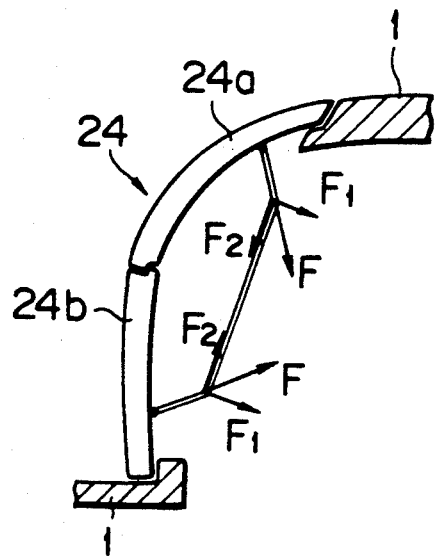
FIG. 21 is a sectional view showing component forces acting on the lid.

According to the illustrated embodiment, the belt member 223 is provided for the lids 24a and 24b in a manner such that a component force $F_2$ urges the lids 24a and 24b against each other and a component force $F_1$ urges the respective lids 24a and 24b against the instrument panel 1 as shown in FIG. 21. Thus, the lids 24a and 24b can be tightly engaged with each other as well as with the instrument panel 1.

Figure 22:
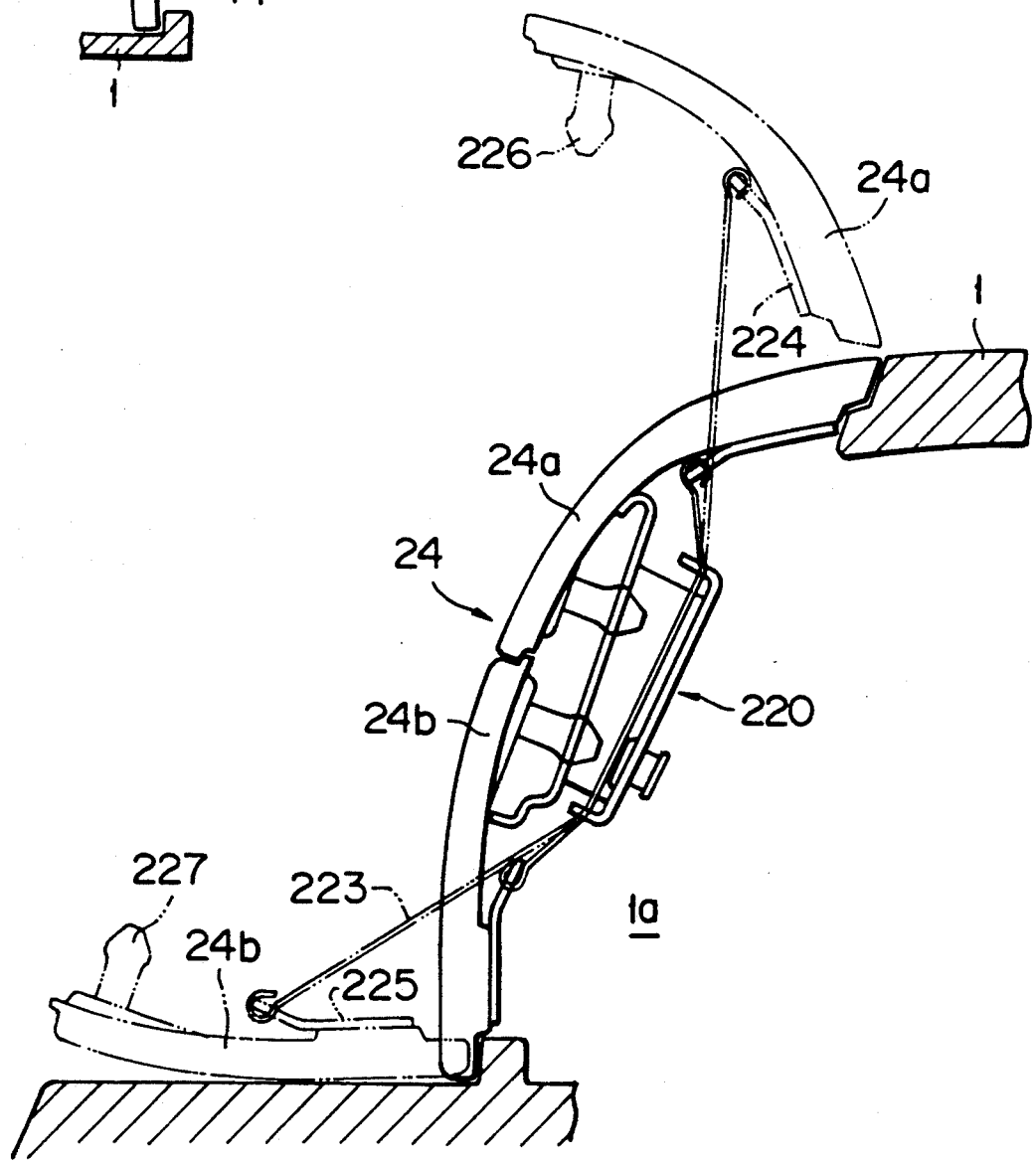
FIG. 22 is a sectional view showing operation of the lid.

Referring to FIG. 22, as the air bag 22 is inflated, the lids 24a and 24b are opened and, the upper lid 24a is swung upwardly about the upper end thereof and the lower lid 24b is swung downwardly about the lower end thereof. The upper lid 24a and lower lid 24b are connected through the resilient belt member 223 so that the lids 24a and 24b are slightly moved away from the instrument panel 1, then swung away from each other.

Figure 23:
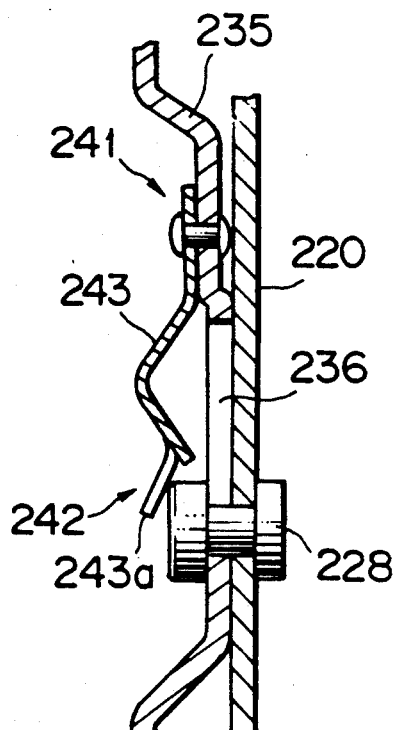
FIG. 23 is a sectional view of a lock plate.
Figure 24:
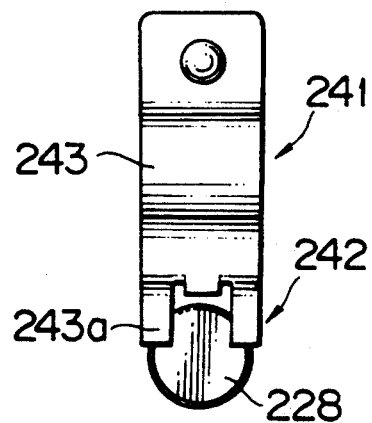
FIG. 24 is a side view of the lock plate.

Referring to FIGS. 23 and 24, the illustrated base plate 235 is provided with guide means 241 having a lock plate 243 constituting a lock means 242 which is cantilevered on the base plate 235. When the first engaging portion 228 is inserted into the hole 236, the lock plate 243 is resiliently deformed to be displaced away from the hole 236 to allow the first engaging portion 228 to be engaged with the base plate 235. When the first engaging portion 228 is slid downwardly in the hole 236 to be disengaged from the lock plate 243, the lock plate 236 is resiliently returned so as to be abutted on the back side of the base plate 235. As a result, the lock plate 243 prevents the engaging portion 228 from moving upwardly. The lock plate 243 is formed with a biforked disengaging or unlocking portion 243a at the free end as shown in FIG. 22. When an appropriate tool such as a screw driver is engaged with the unlocking portion 243a to move the lock plate 243 away from the base plate 236, the lock plate 243 can be disengaged from the first engaging portion 228.

Figure 25:
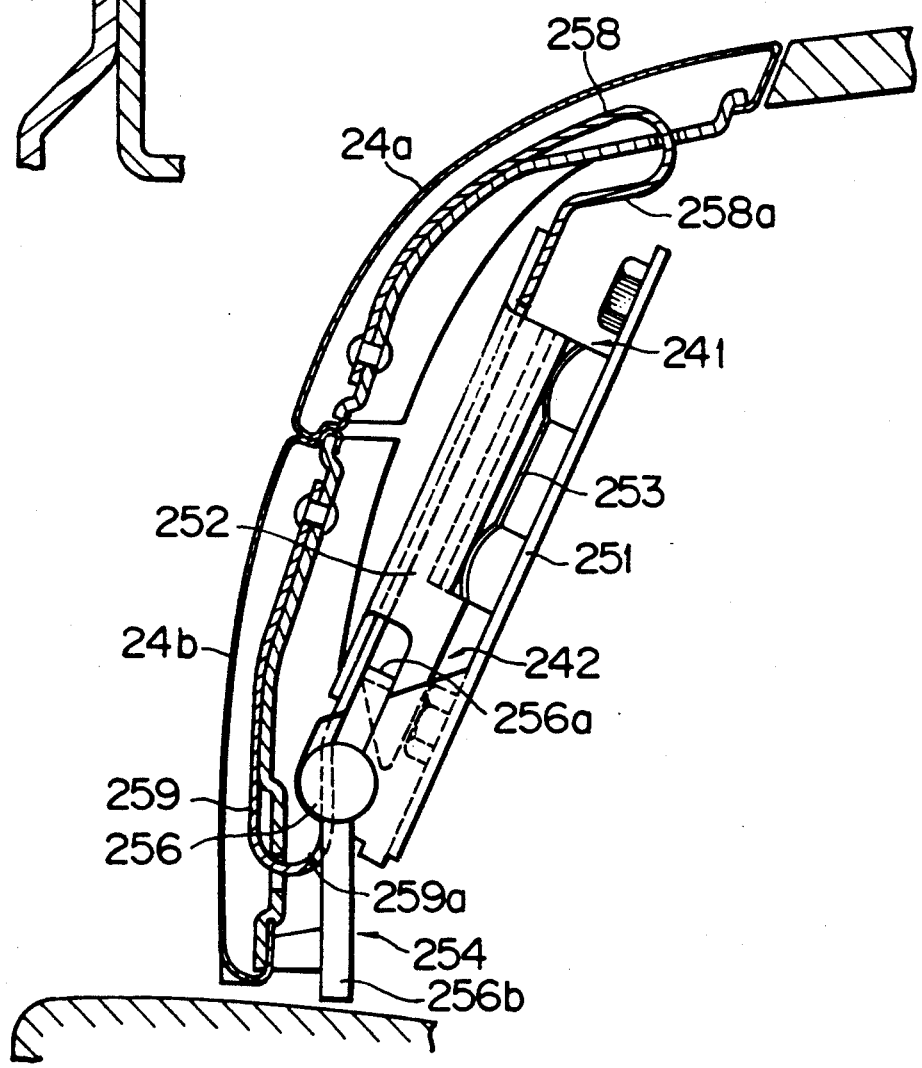
FIG. 25 is a sectional view in accordance with yet another embodiment of the present invention.
Figure 26:
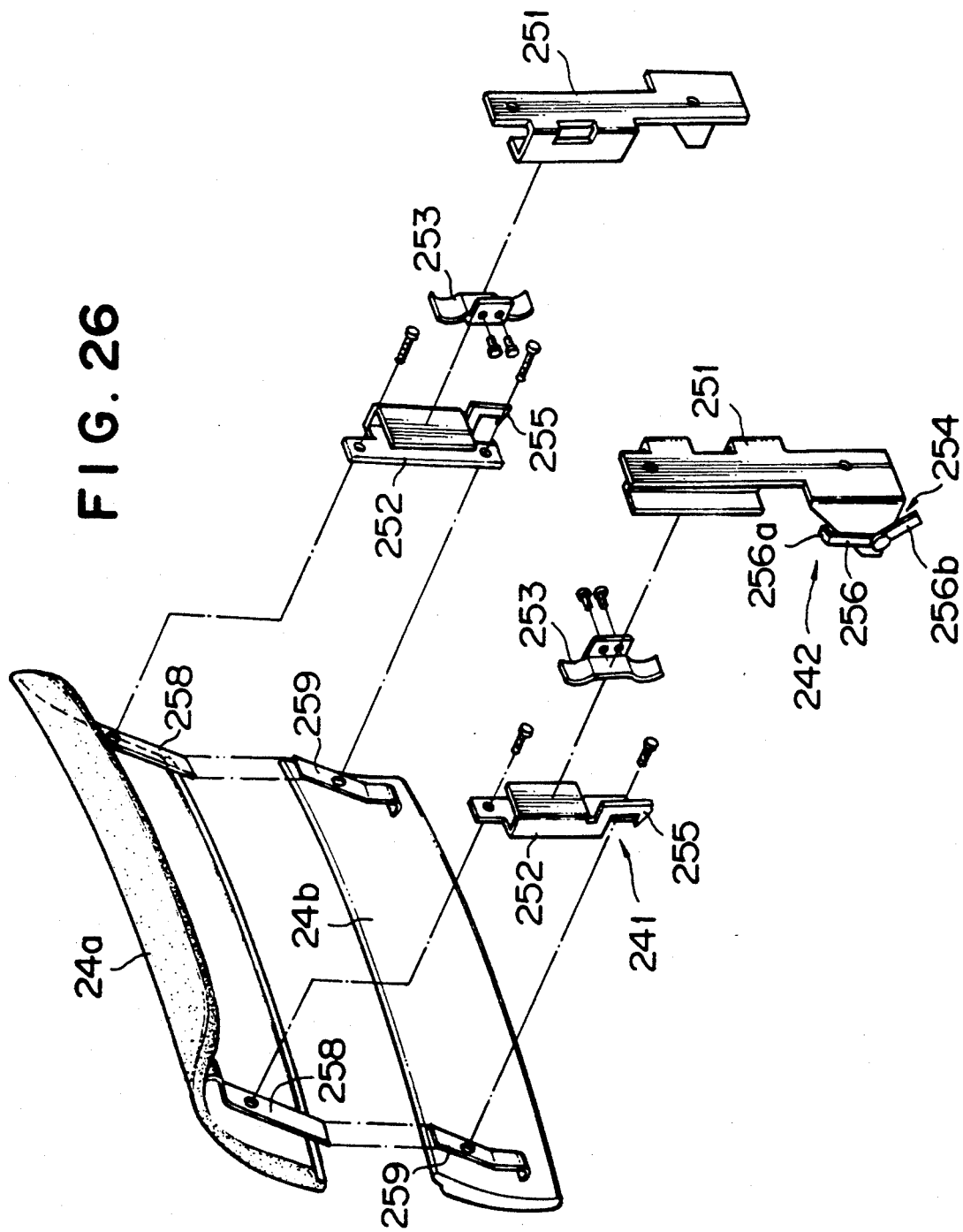
FIG. 26 is an exploded perspective view showing the lid of the embodiment in FIG. 25.
Figure 27:
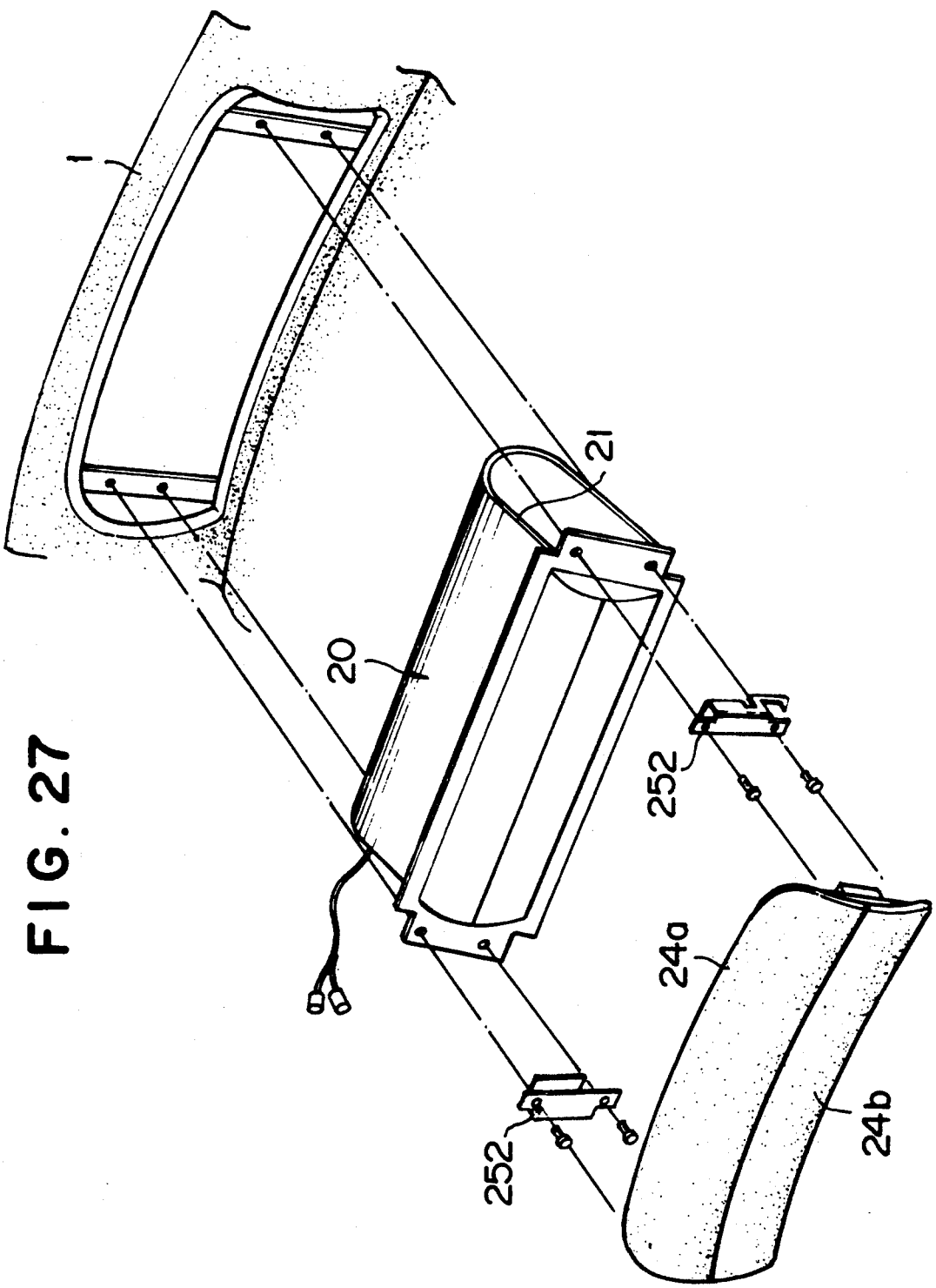
FIGS. 27 and 28 are exploded perspective views showing another type of the lock means.
Figure 28:
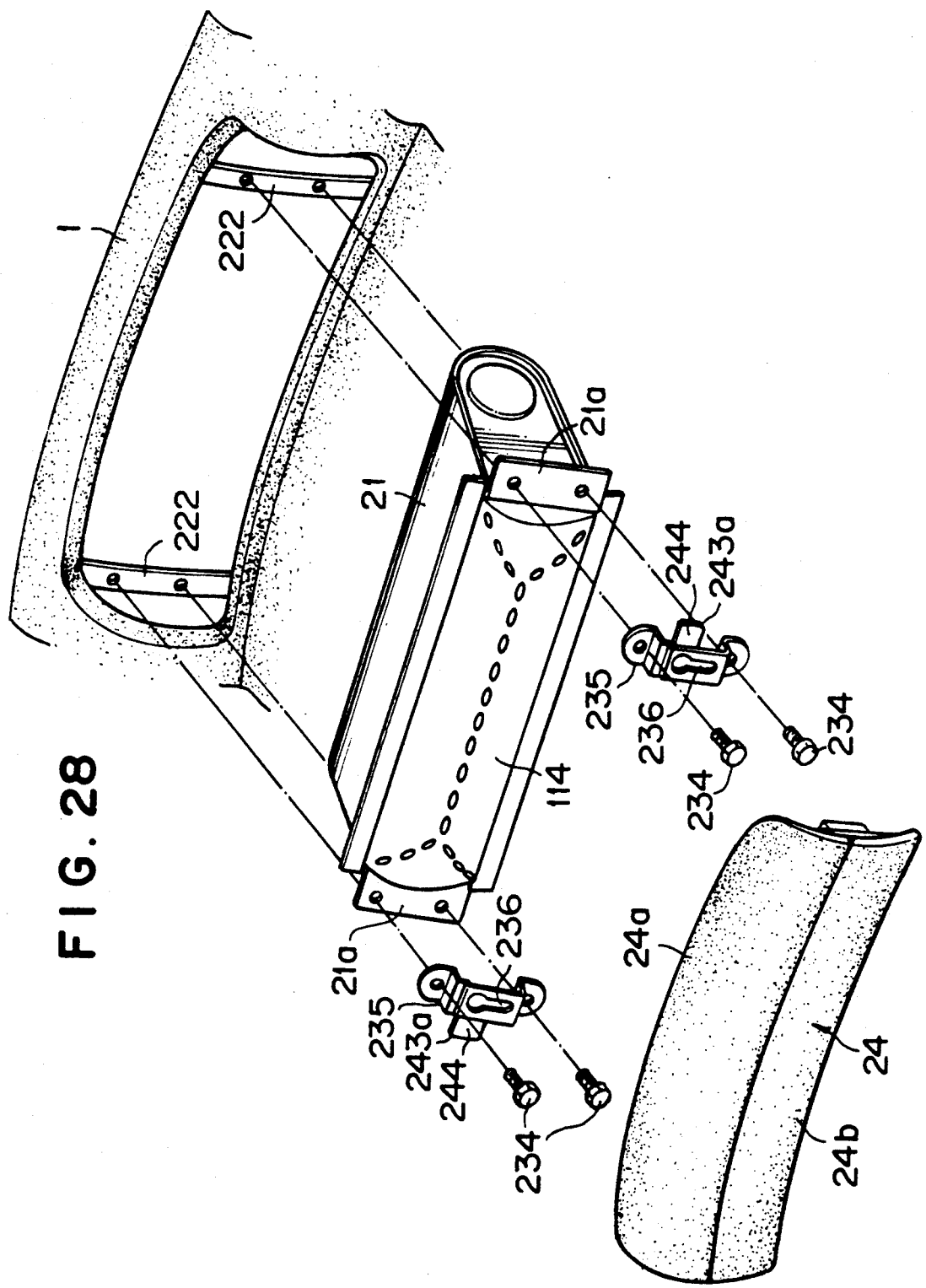
Figure 29:
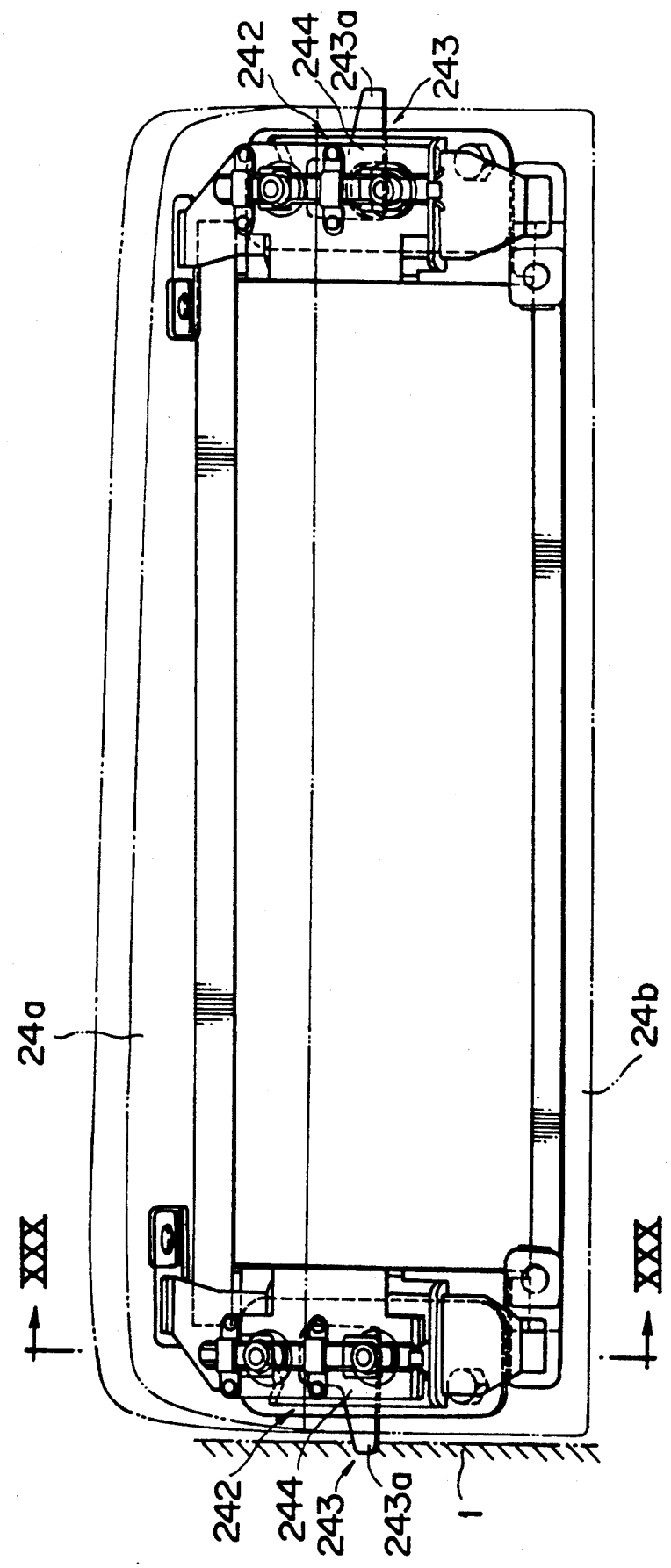
FIG. 29 is an elevational view showing the lock means.
Figure 30:
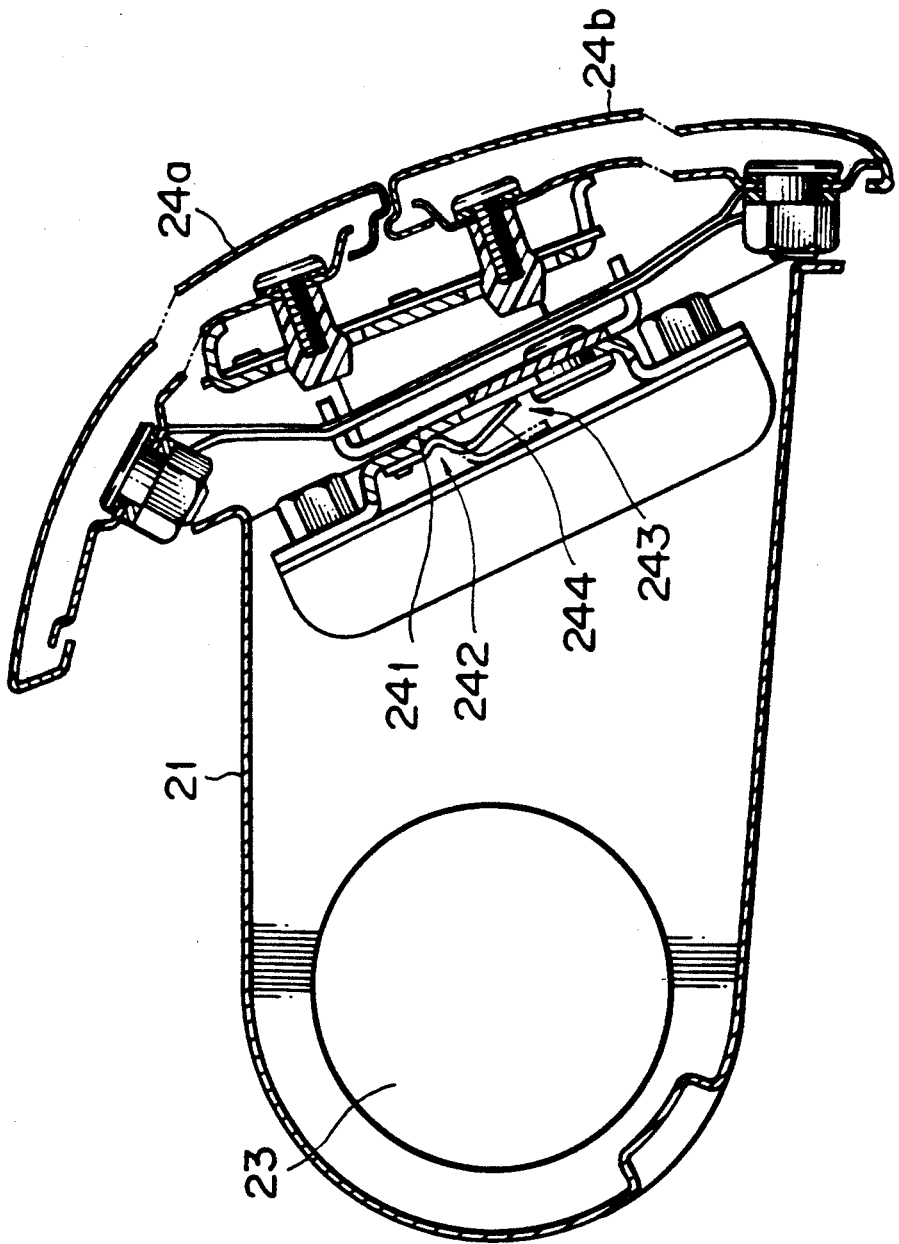
FIG. 30 is a sectional view along a line XXX—XXX in FIG. 29.
Figure 31:
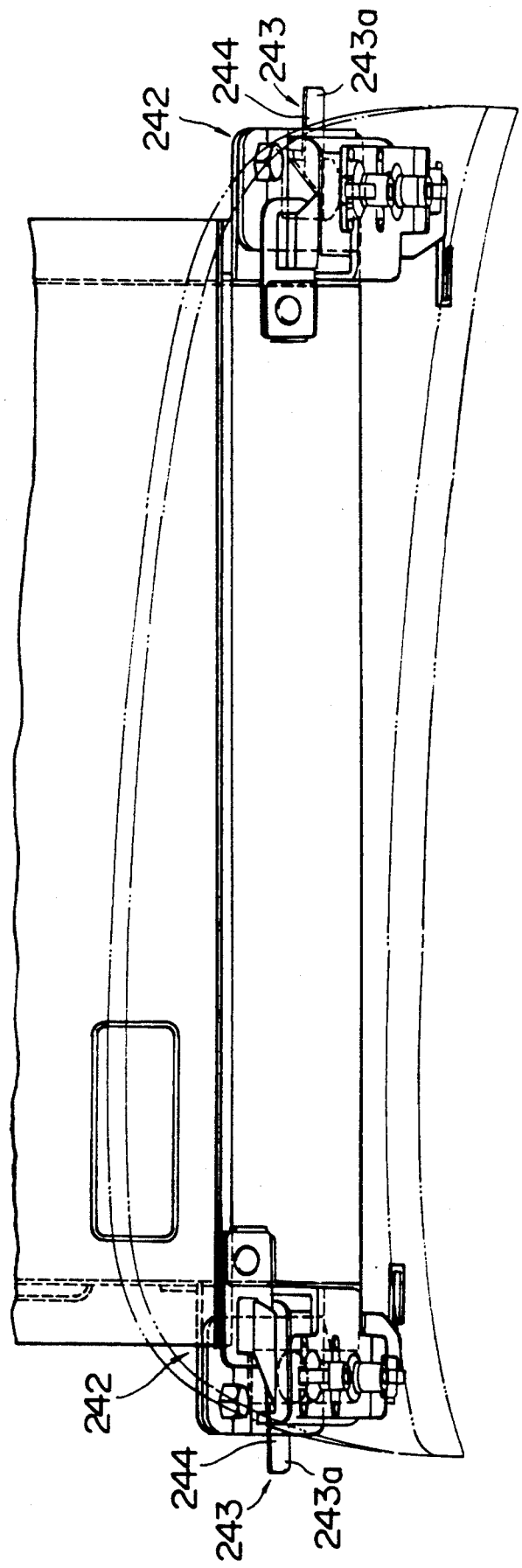
FIG. 31 is a plan view showing the lock means.

Referring to FIGS. 25 through 27, another example of the guide means is shown. The illustrated guide means 241 is provided with a base guide member 251 of a channel like configuration mounted on the casing 21 and a movable guide member 252. A pair of the base guide members 251 is disposed at opposite side portions of the lid 24 with open ends thereof being oriented outwardly. The guide member 251 is mounted on the flange portion 21a. A spring member 253 is provided in the base guide members 251. A pair of the movable guide member 252 is provided to be engaged with the respective base guide members 251. The movable guide member 252 can be slidably engaged with the base guide member 251. A lock means 242 and unlock means 254 are provided at the lower end portion of the guide members 251 and 252. The lock means 242 is provided with a pawl 255, formed on the lower end portion of the movable guide member 252, and an engaging arm 256 provided on the lower end of the base guide member 251 and adapted to be removably engaged with the pawl 255. The engaging arm 256 is provided with an engaging end 256a at one end and a lever portion 256b at the other end. The engaging arm 256 is pivotally mounted on the base guide member 251 at the middle portion. An appropriate urging member such as a spring is provided for urging toward engaged position.

According to the illustrated embodiment, a joint member for connecting the upper and lower lids 24a and 24b is constituted by yielding belt members 258, 259. The members 258 and 259 are arcuated and projected from the inside of the lids 24a and 24b toward back side thereof. The projecting portions 258a and 259a of the belt members 258, 259 are connected with each other through the movable member 252 so that the lids 24a and 24b are assembled as a single unit 24. In assembling the unit 24 to the body, the unit 24 is inserted into the opening 1a of the instrument 1. The movable guide member 252 is moved downwardly along the base guide member 251 so that the pawl 255 of the movable guide member 252 is engaged with the engaging portion 256a of the base guide member 251. Thus, the unit 24 is securely mounted on the instrument panel 1. When the engaging lever 256b is operated to disengage the pawl 255 from the engaging portion 256a, the unit 24 can be removed from the instrument panel 1.

When the air bag 22 is inflated, the lids 24a and 24b can be opened in a manner similar to the former embodiment.

Referring to FIGS. 28 through 31, there is shown another structure of lock means 243.

According to the illustrated structure, there is provided a lock plate 244 which is cantilevered on the base plate 235 and covering the hole 236 at the back side of the base plate 235. The lock plate 244 is formed with a disengaging or unlock portion 243a of a tongue like configuration at the free end thereof. When a tool is inserted into the clearance between the instrument panel 1 and the lids 24a and 24b to push the disengaging portion 243a, the first engaging portion 228 can be unlocked from the base plate 235. Thus, the lid 24 can be removed from the body or instrument panel 1.

What is claimed is:

1. An air bag system comprising
an instrument panel provided with an opening in the vicinity of a passenger's seat,
an air bag unit disposed in the opening and provided with an air bag and a casing for receiving the air bag,
lid means disposed at a rear end of the casing for covering the opening,
at least a pair of connecting means spaced transversely for connecting the lid means with the instrument panel,
one end of each of the connecting means being mounted on the lid means at a position offset from a transverse center line of the lid means.

2. An air bag system as recited in claim 1, wherein each connecting means is a belt member.

3. An air bag system as recited in claim 2, wherein the belt member is made of a resilient material.

4. An air bag system as recited in claim 1, and further comprising holding means for maintaining the lid means in a closed position,
the holding means being prevented from projecting from the lid means as the lid means is opened.

5. An air bag system as recited in claim 4, wherein the holding means is ruptured when the lid means is opened.

6. An air bag system as recited in claim 1, and further comprising at least a pair of clips spaced transversely for engaging a transversely extending end of the lid means with a transversely extending edge of the instrument panel defining a part of the opening, the clips allowing the lid means to be disengaged from the instrument panel as the lid means is opened.

7. An air bag system as recited in claim 1, wherein, the lid means comprises an upper lid and lower lid divided along a transverse line.

8. An air bag system as recited in claim 7, wherein the upper lid is swung upwardly as it is opened about an upper end and the lower lid is swung downwardly as it is opened about a lower end.

9. An air bag system as recited in claim 7, wherein the upper and lower lids are urged against each other by virtue of tensional force of the connecting means.

10. An air bag system as recited in claim 7, wherein the connecting means is arranged so that one component of force is produced to urge an upper end of the upper lid and a lower end of the lower lid against the instrument panel and another component of force is produced to urge the upper lid and the lower lid against each other.

11. An air bag system as recited in claim 7, and further comprising bracket means for combining the upper lid and lower lid to form an single unit.

12. An air bag system as recited in claim 11, wherein the connecting means connects the upper lid with the lower lid and urges resiliently in one direction, the bracket means supporting the upper and lower lid commonly in a direction opposite to the connecting means.

13. An air bag system as recited in claim 12 wherein the connecting means and the bracket means are associated with each other to form the single unit.

14. An air bag system as recited in claim 1, wherein the lid means comprises lock means for locking the lid means against the instrument panel.

15. An air bag system as recited in claim 14 wherein the lid means comprises unlock means for unlocking the lid means from the instrument panel.

16. An air bag system as recited in claim 1, and further comprising stopper means around the opening provided in the instrument panel for receiving the lid means.

17. An air bag system as recited in claim 1, and further comprising guide means for facilitating mounting of the lid means.

18. An air bag system as recited in claim 17, wherein the guide means comprises a base guide member mounted on a body member connected on the instrument panel, and a movable guide member mounted on the lid means, the movable guide member being slidably engaged with the base guide member when the lid means is assembled into the air bag system.

19. A method for assemblying an air bag system comprising the steps of:

mounting an air bag unit in a space defined by an instrument panel through an opening of the instrument panel, mounting a lid on the instrument panel with the opening being opened, connecting the lid with the instrument panel by at least one connecting member at a position offset from a transverse center of the lid.

closing the lid to cover the opening. and engaging a holding member with the instrument panel to keep the lid at the closed position.

20. A method for assembling an air bag system as recited in claim 19, wherein said holding member does not project beyond the lid as the lid is opened.

21. A method for assembling an air bag system as recited in claim 20, wherein the holding member closes the lid by engaging a back side of the lid and maintains the lid at the closed position.

* * * * *